United States Patent
Heggelund

(10) Patent No.: US 10,957,082 B2
(45) Date of Patent: Mar. 23, 2021

(54) METHOD OF AND APPARATUS FOR PROCESSING GRAPHICS

(71) Applicant: Arm Limited, Cambridge (GB)

(72) Inventor: Frode Heggelund, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/934,223

(22) Filed: Mar. 23, 2018

(65) Prior Publication Data
US 2018/0300915 A1 Oct. 18, 2018

(30) Foreign Application Priority Data
Apr. 13, 2017 (GB) .................................... 1706019

(51) Int. Cl.
*G06T 11/40* (2006.01)
*G06T 1/20* (2006.01)
*G06T 7/11* (2017.01)
*G06T 7/13* (2017.01)
*G06T 15/00* (2011.01)

(52) U.S. Cl.
CPC .............. *G06T 11/40* (2013.01); *G06T 1/20* (2013.01); *G06T 7/11* (2017.01); *G06T 7/13* (2017.01); *G06T 15/005* (2013.01)

(58) Field of Classification Search
CPC ....... G06T 11/203; G06T 15/10; G06T 3/403; G06T 11/40; G06T 15/30; G06T 15/40; G06T 15/04; G06T 15/06; G06T 15/60; G06T 7/507; G06T 15/005; G06T 1/20; G06T 7/11; G06T 7/13; G06T 2219/2004
USPC ........................................................ 345/419
See application file for complete search history.

(56) References Cited

U.S. PATENT DOCUMENTS

| | | | | |
|---|---|---|---|---|
| 2012/0280992 A1* | 11/2012 | Shebanow | .............. | G06T 11/40 345/420 |
| 2012/0281004 A1* | 11/2012 | Shebanow | .............. | G09G 5/36 345/557 |
| 2014/0125669 A1* | 5/2014 | Kilgariff | ................. | G06T 15/80 345/426 |
| 2014/0253555 A1* | 9/2014 | Lum | ..................... | G06T 15/005 345/428 |
| 2014/0267232 A1* | 9/2014 | Lum | ..................... | G06T 17/00 345/419 |

(Continued)

OTHER PUBLICATIONS

Tomas Akenine-Moller, "A Simple Algorithm for Conservative and Tiled Rasterization", Feb. 24, 2004, pp. 1-6, retrieved from http://fileadrnin.cs.lth.se/graphics/research/papers/2005/cr/_conservative.pdf (Year: 2004).*

(Continued)

*Primary Examiner* — Jin Cheng Wang
(74) *Attorney, Agent, or Firm* — Vierra Magen Marcus LLP

(57) ABSTRACT

When performing conservative rasterisation in a graphics processing pipeline, modified edge information that accounts for an error in the dimensions of a primitive is determined by a primitive set-up stage. That modified edge information is then used by a rasterisation stage to determine whether the primitive covers one or more sampling points associated with pixels to be displayed. The same modified edge information can also be used to determine if the pixels are fully covered by the primitive irrespective of any rounding effects (errors) in the position of the (vertices of the) primitive.

19 Claims, 8 Drawing Sheets

(56) References Cited

U.S. PATENT DOCUMENTS

| | | | | |
|---|---|---|---|---|
| 2014/0267238 | A1* | 9/2014 | Lum | G06T 3/403 |
| | | | | 345/419 |
| 2015/0235340 | A1* | 8/2015 | Mouri | G06T 1/20 |
| | | | | 345/501 |
| 2015/0371433 | A1* | 12/2015 | Lecocq | G06T 15/60 |
| | | | | 345/422 |
| 2016/0035129 | A1* | 2/2016 | Bolz | G06T 15/005 |
| | | | | 345/420 |
| 2017/0287207 | A1* | 10/2017 | Clarberg | G06T 15/005 |
| 2017/0345213 | A1* | 11/2017 | Ernst | G06T 19/006 |
| 2019/0057544 | A1* | 2/2019 | Lecocq | G06T 15/06 |

OTHER PUBLICATIONS

Combined Search and Examination Report dated Sep. 21, 2017, GB Patent Application No. GB1706019.5.
Hasselgren, et al., "Chapter 42. Conservative Rasterization," GPU Gems, NVIDIA Corporation Apr. 2018, available at: https://developer.nvidia.com/gpugems/GPUGems2/gpugems2_chapter42.html.

* cited by examiner a)

b)

METHOD OF AND APPARATUS FOR PROCESSING GRAPHICS

BACKGROUND

The technology described herein relates to a method of and apparatus for processing graphics, and in particular to a method of and apparatus for performing conservative rasterisation in a graphics processing pipeline.

Graphics processing is normally carried out by first splitting the scene to be displayed into a number of similar basic components or "primitives", which primitives are then subjected to the desired graphics processing operations. The graphics "primitives" are usually in the form of simple polygons, such as triangles. Each primitive is at this stage usually defined by and represented as a set of vertices, where each vertex for a primitive has associated with it a set of data (such as position, colour, texture and other attributes data) representing the vertex.

Before primitives and their vertices can be processed by a graphics processing pipeline, the attributes of the vertices originally defined for a given graphics processing output (e.g. draw call) are usually subjected to an initial so-called "vertex shading" operation that operates to transform the attributes for each originally defined vertex into a desired form for the subsequent graphics processing operations.

This may comprise, for example, transforming the originally defined vertex position attributes from the world or user space that they are initially defined for to the screen space that the output of the graphics processing system is to be displayed in.

The graphics processing pipeline, e.g. the vertex shading stage of the graphics processing pipeline, will typically receive the vertex data, e.g. vertex position data, in a first form defined for the vertices (primitives) (e.g. a floating point form), but then convert that data from its defined form to a form to be used later on in the graphics processing pipeline (e.g. a 16.8 fixed-point coordinate form). This conversion will accordingly have the effect of "snapping" the originally defined vertex positions (e.g. in floating point form) for a given graphics processing output to the array of vertex positions (a "vertex position grid") that can be represented using the lower precision vertex position format (e.g. a 16.8 fixed-point coordinate form) which will be used when rasterising and rendering the primitives for the graphics processing output.

The converted ("snapped") vertex positions are typically then used to determine further information defining the primitives to be used by the graphics processing pipeline, such as information representing the positions of the edges of each primitive. Usually, this edge information is determined at a primitive (triangle) set-up stage of the graphics processing pipeline.

After the primitive information, e.g. edge information, is determined in the primitive set-up stage, this information is used in subsequent processing stages of the graphics processing pipeline in order, e.g., to generate a render output. This usually involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterisation process typically maps the primitives defining the render output to be generated to the array of sampling points which will be used to render the output, which is usually in the form of a sampling point grid.

Determining whether a primitive covers any sampling points in the sampling point grid is typically done by testing the sampling points' positions against the edges of the primitive. To do this, the graphics processing pipeline will normally use the edge information representing each of the edges of the primitive to test the sampling points' positions. If a sampling point position "passes" the edge test, it is taken to be covered by the primitive. If a sampling point position "fails" the edge test, it is taken to be outside (and therefore not covered by) the primitive.

Typically respective groups of one or more sampling points of the sampling point grid being used are associated with respective regions of the render output, such as the pixels to be rendered. Accordingly, a pixel (or suitable region of a render output) will be deemed to be covered by a primitive (and the primitive will be determined as needing to be rendered for that pixel (region)) if at least one of its associated sampling points in the sampling point grid are covered by the primitive.

When converting vertex positions to a different format (i.e. snapping vertices to a (lower precision) array of vertex positions (vertex position grid) as mentioned above, errors may be introduced in the exact positions of the vertices (and thus the primitives), as compared to the vertex positions in their initial (higher precision) format.

For example, the conversion of the vertex coordinates from a floating point format to the (e.g. 16.8) fixed-point format used in the rasterisation process can introduce rounding errors in the positions of the primitive's vertices compared to the original floating point vertex coordinates, which can, e.g., correspondingly lead to differences in the regions (e.g. pixels) that are determined as being (at least partly) covered by a primitive as compared to what would be the case if using the original floating point vertex coordinates.

Such rounding errors can be particularly problematic in a number of situations, such as where a graphics primitive is to be used in graphics processing operations such as collision detection, occlusion culling and visibility detection.

In order to reduce the problems associated with rounding errors in primitives' positions when converting primitives' vertex positions, a form of rasterisation known as "conservative rasterisation" has been developed. (Some graphics APIs such as OpenGL and DirectX define such conservative rasterisation.) Conservative rasterisation is intended to ensure that the primitive as rasterised is conservative with respect to the original floating point vertex coordinates.

There are usually two aspects to conservative rasterisation: "outer coverage" which is to identify those render output regions (e.g. pixels) that are definitely outside the entire primitive irrespective of any rounding effects for the primitive's position; and "inner coverage" which is to identify those render output regions (e.g. pixels) that are definitely fully covered by a primitive irrespective of any rounding effects on the primitive's position.

(There will also be an area between the outer and inner coverage that will include render output regions that are partially covered (and that together with the inner coverage area must include any region that is at least partially covered by the primitive). The render output regions in this area are likely to be partially covered, but it may also include fully covered regions and regions that are not covered at all, as there may be some extra false positives.)

The Applicants believe that there remains scope for improvements to methods of and apparatus for performing conservative rasterisation in a graphics processing pipeline.

BRIEF DESCRIPTION OF THE DRAWINGS

Embodiments of the technology described herein will now be described by way of example only and with reference to the accompanying drawings, in which.

Like reference numerals are used for like components where appropriate in the drawings.

DETAILED DESCRIPTION

Figure 1:
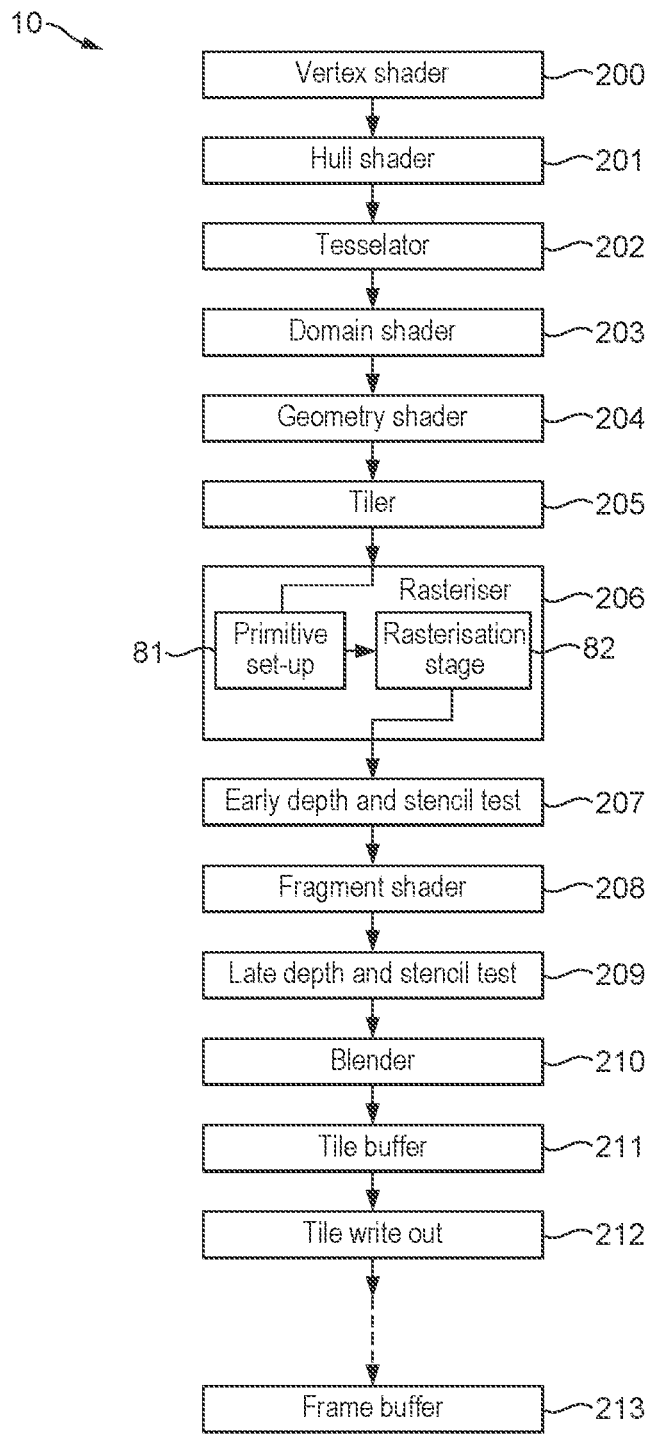
FIG. 1 illustrates schematically an exemplary graphics processing pipeline.

A first embodiment of the technology described herein comprises a method of operating a graphics processing pipeline that includes a plurality of processing stages including a primitive set-up stage and a rasterisation stage, the method comprising:

the primitive set-up stage receiving information representing vertices defining a primitive to be rendered by the graphics processing pipeline and determining therefrom edge information representing the positions of an edge or edges of the primitive;

the primitive set-up stage using the determined edge information to determine, for the primitive, modified edge information representing modified positions for the edge or edges of the primitive; and the rasterisation stage using the modified edge information for the primitive to determine, for at least one region of a graphics render output being generated, whether the primitive covers the region of the render output by:

determining using the modified edge information for the primitive whether the primitive covers at least one sampling point of a group of one or more sampling points from a sampling point grid representing the render output being generated that represents the region of the render output.

A second embodiment of the technology described herein comprises a graphics processing pipeline that includes a plurality of processing stages including:

a primitive set-up stage configured to:
 receive information representing vertices defining a primitive to be rendered by the graphics processing pipeline and to determine therefrom edge information representing the position of the edges of the primitive; and
 use the determined edge information to determine, for the primitive, modified edge information representing modified positions for the edge or edges of the primitive; and a rasterisation stage configured to:
 use the modified edge information for the primitive to determine, for at least one region of a graphics render output being generated, whether the primitive covers the region of the render output by:
  determining using the modified edge information for the primitive whether the primitive covers at least one sampling point of a group of one or more sampling points from a sampling point grid representing the render output being generated that represents the region of the render output.

The technology described herein relates to a method of operating a graphics processing pipeline that includes a primitive set-up stage that determines edge information representing the edges of primitives provided to the primitive set-up stage and a rasterisation stage that maps primitives to a sampling point grid associated with a graphics render output that is to be generated (e.g. for display).

In the technology described herein, the primitive set-up stage of the graphics processing pipeline first determines the edges of a primitive using vertex information provided for the primitive, but then determines modified positions for the edges for the primitive. The modified positions for the edges of the primitive are then used when mapping the primitive to a sampling point grid to determine whether the primitive covers one or more sampling points associated with regions (e.g. pixels) of the graphics render output.

As will be described further below, the modified positions for the primitive's edges can be, and are in an embodiment, used to define an "uncertainty region" around the primitive that can be used, e.g., and in an embodiment, to allow for all possible positions a primitive's initially defined vertices may round to when converting ("snapping") those vertex positions for processing. The rasterisation process can correspondingly use the modified positions for the primitive's edges to (conservatively) determine the coverage of the primitive, e.g. taking account of any rounding errors in the primitive's converted (snapped) vertex positions.

The technology described herein determines modified positions for a primitive's edges at the primitive set-up stage. This has, as will be discussed further below, a number of advantages, and can, in particular, provide, e.g., an overall more efficient graphics processing pipeline, when performing conservative rasterisation.

For example, determining modified edge positions at the primitive set-up stage avoids having to execute a separate geometry shading stage to generate new, modified vertices (vertex positions) for each primitive to take account of potential errors in the primitive's dimensions, and any subsequent processing by the graphics processing pipeline of those modified vertices.

Modifying the positions of the edges of a primitive at the primitive set-up stage is also advantageous in that the rasterisation stage can perform a rasterisation operation (using the modified edges) in the normal manner (and without, e.g., the need to modify the positions of the sampling points that are used when rasterising a primitive). This may be particularly advantageous in graphics processing pipelines that are configured to perform a hierarchical rasterisation process (as will be discussed further below), as it can avoid the need to modify the positions of the sampling points in the sampling point grid at each hierarchical rasterisation level.

The primitive set-up stage can be located at any suitable or desired position within the graphics processing pipeline that, e.g. is after the vertex shading stage (and a geometry shading of the graphics processing pipeline, if any). In an embodiment, the primitive set-up stage is part of a rasterisation stage (the rasteriser) of the graphics processing pipeline. Alternatively, the primitive set-up stage may be separate to the rasterisation stage (rasteriser), e.g. at a stage of the graphics processing pipeline that is (e.g. immediately) before the rasterisation stage.

In an embodiment, the primitive set-up stage comes after any shader stages prior to the rasterisation stage and before rasterisation (and may be implemented as a stage prior to rasterisation, or as part of the rasteriser (but before rasterisation itself)). Where the graphics processing pipeline is a tile-based graphics processing pipeline, then the primitive set-up stage can be, and in an embodiment is, located after the tiling stage of the graphics processing pipeline. In this case, some processing using the (snapped) vertices in order to determine information that is to be used by the tiler to execute the tiling operation, such as deriving a bounding box for a primitive, may be performed (e.g. by the tiler) prior to the primitive set-up stage, if desired.

The information representing the primitive vertices that is provided to the primitive set-up stage can be any suitable and desired such information. For example, the information may comprise a set of vertex attributes data (such as position, colour, texture and other attributes data) representing each vertex defining the primitive(s). It in an embodiment comprises vertex position data.

In some embodiments, the graphics processing pipeline will comprise a vertex shading stage before the primitive set-up stage that executes vertex shading operations on the initial vertex attributes data defined for the vertices so as to generate a desired set of output vertex attributes (i.e. appropriately "shaded" attributes) for use in subsequent processing stages of the graphics processing pipeline. In such pipelines, the information representing the vertices provided to the primitive set-up stage may comprise a set of "vertex shaded" vertex attributes data (e.g. appropriately transformed vertex position data) for processing by the rest of the graphics processing pipeline.

The primitive set-up stage can use the vertex information (the (e.g. transformed) vertex position data) to determine edge information representing the positions of the edges of the primitive in any suitable and desired manner.

In an embodiment, initial vertex position information, e.g. vertex position attributes data, is converted (e.g. by the vertex shading stage) from its original form (e.g. and in an embodiment a higher precision and/or floating point form) to a different form (e.g., and in an embodiment, an, in an embodiment fixed point, form having a given (in an embodiment lower) precision), with the primitive set-up stage then using the converted vertex position information for determining the edge information representing the positions of the edges of the primitives (e.g., and in an embodiment, for the rasterisation process). Thus, in an embodiment, vertex positions in a lower precision, and in an embodiment fixed point, format are used by the primitive set-up stage to determine the positions of the edges of the primitive.

The conversion of the vertex positions to the, e.g., lower precision format can take place at any appropriate and desired stage in the graphics processing pipeline. In an embodiment this is done in the vertex shader, e.g. as the vertex shader writes the "vertex-shaded" vertex positions out to storage (memory) for use by the rest of the pipeline.

It should be noted here that although vertex positions will be converted to a, e.g. lower precision, fixed point format that will be used by the primitive set-up stage to determine the positions of the edges of the primitive, the so-converted (lower precision) vertex positions need not necessarily be stored in memory in a fixed point format. For example, the converted vertex positions may still be stored in memory using a floating point representation (but which indicates the converted (lower precision), "snapped" positions).

The edge information determined by the primitive set-up stage from the information representing the vertices of the primitive can be any kind of information suitable for representing the positions of the edges of the primitive.

In an embodiment, the edge information comprises one or more line equations, each defining a respective edge of the primitive. In an embodiment a line equation is provided for each edge of the primitive.

The line equation for a (and for each) edge is in an embodiment of the form:

$$ax+by+c=0$$

where x and y are the position variables in the plane of the graphics render output, and a, b and c are constants.

The edge information could represent only one edge of the primitive, but in embodiments the edge information comprises information specifying the position of plural, and in an embodiment of all, of the edges of the primitive. Thus, the edge information in an embodiment indicates and represents each respective edge of the primitive.

Once the edge information (e.g. line equations) indicating the edges of the primitive has been generated using the converted (snapped) primitive vertices, then the primitive set-up stage uses that originally determined edge information to determine modified edge information for the primitive.

Modified edge information should be, and is in an embodiment, determined for at least one, in an embodiment for plural, and in an embodiment for each, primitive edge to which the determined edge information relates. In an embodiment modified edge information is determined for each edge of the primitive.

The modified edge information that is determined for a primitive (for the edges of a primitive) can take any suitable and desired form, but is in an embodiment of the form discussed above for the originally determined edge information. Thus, in an embodiment, the modified edge information again comprises a set of line equations representing one or more, and in an embodiment each, edge of the primitive (but which line equations are modified with respect to the initially determined line equations for the edges of the primitive).

In an embodiment, both the original determined edge information and the modified edge information are stored for use by the graphics processing pipeline. However, in embodiments once the modified edge information has been generated, only the modified edge information is stored for future use (and the original edge information may, e.g., be discarded).

The modified edge information represents a modified position of a (and in an embodiment each) primitive edge (compared to the position of the edge(s) as defined by the original edge information determined by the primitive set-up stage from the converted (snapped) vertices for the primitive).

The position of a primitive edge may be modified in any suitable and desired way. It is in an embodiment done by moving the primitive edge relative to (from) the position of the edge as defined by the original (unmodified) edge information determined by the primitive set-up stage from the vertices for the primitive. In an embodiment the primitive edge is moved either towards or away from the centre of the primitive.

In an embodiment, all the primitive's edges are all moved in the same direction relative to the centre of the primitive (i.e. all inwardly or all outwardly).

In an embodiment, the primitive set-up stage determines modified edge information that represents edge(s) for the primitive that have been moved outwards (i.e. away from the position of the centre of the primitive) relative to the originally determined primitive edges. That is, the primitive set-up stage will in this embodiment determine modified edge information representing the edges for an expanded version of the primitive in question (relative to the dimensions of the primitive when defined by the edges joining the converted (snapped) primitive vertices). This may be particularly appropriate when the modified edge information is to be used to test the outer coverage of a primitive.

The (and in an embodiment each) primitive edge is in an embodiment moved relative to the position of the edge as defined by the original (unmodified) edge information determined by the primitive set-up stage from the vertices for the primitive by a particular, in an embodiment selected, in an embodiment predetermined, offset amount. In an embodiment a (and in an embodiment each) primitive edge is moved by the particular offset amount along an axis direction for the render output being generated (e.g. along the x or y axis in the plane of the sampling point grid that is to be used for the rasterisation process). The primitive edges may be offset along the same axis or different axes, e.g. depending upon their orientation (as will be discussed further below).

In an embodiment, each primitive edge for which a modified position is determined is moved by the same amount of offset (i.e. the magnitude of the offset from the position of the primitive edge as defined by the original (unmodified) edge information determined by the primitive set-up stage from the vertices of the primitive is the same for each edge that is moved), although the direction of movement (offset) of the primitive edges may be, and in an embodiment is, different for different edges.

The amount that each primitive edge is offset (the offset value) relative to its originally determined position can be any suitable and desired offset amount. In an embodiment, the offset amount is set so as to, in effect, define an uncertainty region between the position of the modified primitive edge and the originally determined position of the primitive edge, that can, and in an embodiment does, allow for potential rounding (or other) errors introduced in the positions of the vertices defining the primitives' edges.

Thus, the positions of a primitive's edges are in an embodiment modified based on an error associated with the dimensions of the primitive. In an embodiment this is based on the magnitude of known, potential errors in the primitive's dimensions that may be caused by the vertex or primitive set-up process, such as, and in an embodiment, potential rounding errors that will be introduced by converting vertex position data from floating point format to a fixed point format that is to be used by the graphics processing pipeline.

Correspondingly, in an embodiment, the modified positions for the primitives' edges are set so as to (try to) account for (potential) errors associated with the dimensions of the primitive, and in an embodiment (in an embodiment at least) so as to (try to) take account of rounding errors in the primitives' (snapped) vertex positions. In an embodiment, the modified positions for the primitives edges are set so as to, in effect, define an uncertainty region between the position of the modified primitive edge and the position of the primitive edge as originally determined by the primitive set-up stage, which uncertainty region will include at least some, and in an embodiment all, of the possible positions that the primitive edge could have in the direction of the offset for the edge allowing for any potential errors in the positions of the vertices defining the primitive's originally determined edge.

In general, the edge offset should be at least sufficient to account for (expected) errors in the primitive's dimensions, but may be larger than that value (although in an embodiment the offset is not too large as that would in itself introduce further errors).

In an embodiment, the distance that a primitive edge is offset in a particular direction to determine the modified edge position is based on and dependent on the size and/or nature of the vertex position grid that the original vertex positions (e.g. in floating point form) are snapped to, e.g. in the vertex shading stage of the graphics processing pipeline.

In an embodiment, the offset value (and thus the size of the uncertainty region) depends on (and is based on) the precision, i.e. the resolution, of the vertex position grid that the vertices are "snapped" to be used later on in the graphics processing pipeline (e.g. as defined using a 16.8 fixed-point coordinate format). The Applicants have recognised in this regard, e.g., that the distance between adjacent vertex positions in the "snapped" vertex position grid (which corresponds to the resolution of the vertex position grid) will determine the margin of error associated with the position of the edges as determined by the primitive set-up stage. The resolution of the vertex position grid (and therefore the separation between adjacent "permitted" (representable) vertex positions) will depend on the (lower precision), e.g., fixed-point, coordinate format to be used for the vertex positions. For example, the resolution of the vertex position grid (and therefore the separation between adjacent vertex positions therein) may correspond to the 8-bit subpixel precision for conservative rasterisation in DirectX.

In this regard, the distance between adjacent vertex positions in the "snapped" vertex position grid (and so the resolution of the vertex position grid) can be, and in an embodiment is, defined as a given fraction of the pixel spacing (of the size of the pixel) of the render output. In embodiments, the distance separating adjacent vertex positions in the vertex position grid corresponds (e.g. is set) to $1/256$ of a pixel. The Applicants have recognised that if the "uncertainty" region that is defined by the modified positions of a primitive's edges is less than half the vertex position spacing in the grid of vertex positions to which the originally defined vertices are snapped, then that may not account for all possible rounding errors in the primitive's dimensions caused by, e.g., converting the vertex position data from floating point format to a fixed point format. Accordingly, in an embodiment, the minimum amount by which each primitive edge is offset for the edge modification process is equal to half the vertex position spacing in the grid of vertex positions to be used.

The distance that a primitive edge is offset in a particular direction to determine the modified edge position need not always be based on the precision of the vertex position grid that is to be used to convert the vertices from their originally defined form to a form to be used later on in the graphics processing pipeline (e.g. a 16.8 fixed-point coordinate form).

In another embodiment, the distance that a primitive edge is offset in a particular direction to determine the modified edge position is based on and dependent on the size and/or nature of the sampling point grid that is to be used during the rasterisation process. The offset value (and thus the size of the uncertainty region) in an embodiment depends on (and is based on) the precision, i.e. the resolution, of the sampling point grid that is to be used for the rasterisation process.

As will be discussed further below, the sampling point grid that is to be used for the rasterisation process should, and in an embodiment does, include groups of one or more sampling points that each correspond to a respective pixel of the render output, i.e. the sampling point grid will represent pixels of the render output at a particular resolution.

In an embodiment, the uncertainty region and the amount that a primitive edge is moved by the edge modification process corresponds to a particular, in an embodiment selected, in an embodiment predetermined, fraction of the pixel spacing of the sampling point grid that is to be used for the rasterisation process.

The Applicants have in particular recognised in this regard that if the "uncertainty" region defined by moving a primitive's edges is greater than half the pixel spacing of the sampling point grid that is to be used for the rasterisation process, then that would risk increasing the dimensions of the primitive beyond any potential rounding errors when converting the vertex positions to the resolution of the, e.g., fixed point, format that is to be used for the rasterisation process for the vertex positions, for the purposes of determining pixel coverage when performing conservative rasterisation. Accordingly, in an embodiment, the maximum offset amount that a (and each) primitive edge is moved by is half the pixel spacing of the sampling point grid that is to be used for the rasterisation process.

Thus, in an embodiment, the uncertainty region and the amount that a primitive edge is moved (offset) for the edge modification process is between (and including) half the vertex position spacing of the "snapped" vertex position grid and half the pixel spacing of the sampling point grid that is to be used for the rasterisation process.

In one embodiment, the distance by which each primitive edge is offset is equal to half the vertex position spacing in the grid of snapped vertex positions to be used. In another embodiment, the distance by which the primitive edge(s) is offset is equal to the vertex position spacing in the grid of vertex positions that the originally defined vertices are snapped to. In another embodiment, the distance by which the primitive edges are offset is equal to half the pixel spacing of the sampling point grid that is to be used for the rasterisation process.

Thus, for example, in the case where a snapped vertex position grid having a vertex position spacing of $1/256$ of a pixel (which would typically be the case where the graphics processing pipeline uses a 16.8 fixed point coordinate representation (and the floating point vertex coordinates are snapped to the 16.8 fixed point coordinate representation)) is being used, then the offset amount by which each primitive edge is offset is in an embodiment equal to one of: $1/512$ of a pixel width, $1/256$ of a pixel width, or $1/2$ of a pixel width.

In another embodiment, the distance by which the primitive edges are offset is equal to the sampling point spacing of the sampling point grid that is to be used for the rasterisation process. The sampling point spacing of the sampling point grid may be comparable to (and in an embodiment is equal to) the spacing of the vertex positions in the vertex position grid. However, in an embodiment, the sampling point grid may have a resolution (and therefore sampling point spacing) that is lower than that of the vertex position grid.

The edge of a primitive could be moved (offset) for this purpose in any suitable and desired manner. For example, the edge could be moved in the direction of the normal to (perpendicular to) the edge to achieve the desired offset amount.

In an embodiment, moving (offsetting) an edge of a primitive comprises detecting the major axis of the edge (e.g., and in an embodiment from the line equation for the edge) (i.e. determining whether the x-axis or y-axis is the major axis for the edge), and then moving the edge by the desired offset amount in the minor axis direction of the edge. That is, in an embodiment, the primitive set-up stage is configured to adjust the edge information by: detecting the major axis of the edge (e.g. from the line equation), and moving the edge outwardly or inwardly (relative to the centre of the primitive) in the minor axis direction of the edge.

In an embodiment each edge is moved (inwards or outwards) in the minor direction (along the minor axis) of the edge by the same particular offset amount (as discussed above).

The major axis of an edge can be, and is in an embodiment, determined by comparing the absolute values of the constants a and b of the line equation for the edge.

Where the edge information comprises line equations, the primitive set-up stage is configured in an embodiment to determine modified edge information for the primitives by adjusting the line equations so as to derive modified line equations that define modified positions for the edges of the primitive.

The Applicants have recognised that where the modified edge information represents edges that have been moved outwardly from the originally determined primitive edge positions, then the apexes of (i.e. the effective vertexes as defined by) the moved (modified) edges (i.e., the points of intersection between the offset edges) may be located at positions that are further away from the snapped vertex positions than could be covered by the primitive even when allowing for any uncertainty (errors) in the vertex positions. This may particularly be the case for relatively long and thin primitives (e.g. triangles).

In order to avoid determining the coverage of regions at the apexes of an expanded primitive that lie outside of a desired error margin (uncertainty region) associated with the originally determined primitive edge positions, in an embodiment such regions are excluded from the modified primitive for the rasterisation process (or at least such regions are not considered when performing the rasterisation). This can be achieved in any suitable and desired manner.

In an embodiment, this is done by constructing a bounding box around the expanded primitive (e.g. triangle), which bounding box is dimensioned and positioned relative to the expanded primitive such that the bounding box will "cut off"

any regions at the apexes of the modified, extended primitive that extend from the snapped vertex positions (the vertex positions to be used by the primitive set-up stage) by more than a desired offset amount (error margin).

The bounding box itself can then be tested against the sampling point grid as well as or instead of the modified primitive edges, if desired, e.g. to (potentially) provide an early culling of the primitives/samples (as it is cheaper to evaluate). In an embodiment, as will be described further below, both the modified primitive edges and the bounding box are tested against the sampling point grid to determine the coverage of the primitive. Thus, in an embodiment, as well as testing whether a sampling point (e.g.) is covered by each edge of a primitive, the sampling point also has to be determined as being within the bounding box for the primitive in order for it to be determined as being covered by the primitive.

In an embodiment, such bounding box testing is used when performing "outer coverage" testing using the modified primitive, but is not used when performing "inner coverage" testing using the modified primitive.

Thus, in an embodiment of the technology described herein, the modified edge information for a primitive also comprises information representing a bounding box for the (modified) primitive.

In an embodiment, the bounding box for a primitive that has been extended by modifying the positions of the primitive's edges in an outward direction from the centre of the primitive is constructed as a bounding box having dimensions and a position that is based on the primitives' vertex positions used to determine the initial (unmodified) positions of the primitives' edges, plus an offset amount (error margin) in an outward direction in both directions along each axis of the sampling point grid.

Correspondingly, in an embodiment a bounding box is generated for an expanded primitive that corresponds to (an axis-aligned) bounding box that is aligned to (that (just) encompasses) the initial vertex positions for the primitive, but for which each edge (of the bounding box) is then expanded outwardly in the axis direction that is perpendicular to the edge by a particular, in an embodiment selected, in an embodiment predetermined, and in an embodiment the same, offset amount (error margin).

In this case, the offset amount for the edges of the bounding box may be, and is in an embodiment, an offset amount similar to (and, e.g., that corresponds to) the offset amounts discussed above in relation to moving the primitive edges. In an embodiment, the bounding box offset amount is equal to the minimum required uncertainty offset amount for the snapped vertex position grid being used (i.e. is equal to half the vertex position spacing in the vertex position grid (and thus equal to $1/512$ pixels where the vertex positions are spaced by $1/256$ pixels in the vertex position grid)).

Where the graphics processing pipeline is a tile-based graphics processing pipeline, then a modified, expanded, bounding box of the form above is in an embodiment (also) used when tiling the primitive (sorting the primitive into respective tile lists for the render output being generated). In this case, a so-modified bounding box to be used for the tiling operation is in an embodiment determined before the modified primitive edges are determined by the primitive set-up stage, e.g., and in an embodiment, by the tiling stage (tiler) of the graphics processing pipeline (as part of the tiling operation), before the tiling itself begins.

After the modified edge information has been determined for a primitive by the primitive set-up stage, the primitive is mapped (by the rasterisation stage) to a sampling point grid that is to be used to rasterise the primitive, using the modified edge information (e.g. expanded or contracted version of the primitive). The sampling point grid is associated with the graphics render output area that is to be generated, e.g. for display, e.g. an array of pixels.

The sampling point grid will comprise an (in an embodiment regular) array of sampling points. Respective groups of one or more sampling points will be, and are in an embodiment, each associated with a respective region (area) of the graphics render output, such as a pixel to be generated (although as will be discussed below, groups of one or more sampling points that are tested may in some arrangements be associated with larger (or smaller) regions, e.g. corresponding to plural pixels).

Each render output region may be represented by a group of only one sampling point (a single sampling point), but in an embodiment the render output regions are each represented by a respective group of plural sampling points.

The actual testing of the modified edges of a primitive against the sampling points of the sampling point grid for the render output area can be performed in any suitable and desired manner. Thus, it can be, and is in an embodiment, performed in the normal manner for testing primitives' edges against sampling points in the graphics processing pipeline in question.

The "modified" primitive should be, and in an embodiment is, mapped to the sampling point grid (rasterised) to determine whether the (modified) primitive covers one or more regions of the render output.

The rasterisation testing of the modified edge information is in an embodiment used to identify those render output regions (e.g., and in an embodiment, pixels) that are definitely outside a primitive irrespective of any rounding effects for the primitive's position (i.e. an outer coverage test), and/or identify those render output regions (e.g., and in an embodiment, pixels) that are definitely and completely covered by a primitive irrespective of any rounding effects on the primitive's position (i.e. an inner coverage test).

In one embodiment, the modified edge information for a primitive is used to map the graphics primitive to the sampling point grid to determine which render output regions the primitive covers at least in part. In this case therefore, using the modified edge information for a primitive to determine whether the primitive covers a region of the render output will comprise determining whether the primitive covers at least a part of the region of the render output. This may be particularly appropriate for a conservative rasterisation outer coverage test.

In another embodiment, the modified edge information for a primitive is also or instead (and in an embodiment also) used to map the graphics primitive to the sampling point grid to determine which render output regions the primitive covers completely. In this case therefore, using the modified edge information for a primitive to determine whether the primitive covers a region of the render output will comprise determining whether the primitive completely covers the region of the render output. This may be particularly appropriate for conservative rasterisation inner coverage testing.

The render output region primitive coverage testing is in an embodiment done by using the modified primitive edge(s) to determine whether the (modified) primitive covers one or more or all of the sampling points in the sampling point grid for a render output region or not. In an embodiment, this comprises testing the (modified) primitive against the group of one or more sampling points in the sampling point grid representing the render output region to determine whether the render output region that the group of sampling positions corresponds to is completely and/or at least partially covered by the primitive.

In an embodiment, the testing of a (modified) primitive against a group of one or more sampling points representing a region of the render output is performed to determine if at least one sampling point of the group of sampling groups representing the region is covered by the (modified) primitive. This would then determine whether the render output region is at least partially covered by the primitive (and may, e.g., be appropriate for outer coverage testing for conservative rasterisation).

Additionally or alternatively, in this case, the testing of a modified primitive against a group of sampling points in the sampling point grid for a render output region could be configured to determine whether none of the sampling points in the group of sampling points representing a render output region is covered by the (modified) primitive (i.e. whether a render output region is not covered at all by the modified primitive).

Correspondingly, in an embodiment the testing of a modified primitive against a group of sampling positions representing a render output region is configured to determine whether all of the sampling points in the group of sampling points representing the render output region are covered by the primitive. This could then be used to indicate whether the render output region is completely covered by the primitive (and so may be appropriate for use when performing inner coverage testing for conservative rasterisation).

In an embodiment a given modified primitive is "coverage" tested against plural render output regions (plural groups of sampling positions representing plural render output regions) in one or more of the above manners. A primitive may be tested against the entire render output area in this manner, or sub-areas of the render output for which such render output region testing is then to be performed could be identified, e.g. based on some approximation of the likely or expected coverage of the primitive.

In an embodiment, the render output is divided into a plurality of rectangular (and in an embodiment square) regions and each region has a group of four sampling points corresponding to the corners of the region associated with it and that are tested by the rasterisation process. (It will be appreciated in this regard that adjacent regions in the render output will share sampling points at their shared corners.)

In this case therefore each region of the render output to be tested for primitive coverage by the rasterisation process will have a group of four sampling points associated with it, corresponding to each of the four corners of the region.

In one such embodiment, a region of the render output is determined as being at least partially covered by a primitive when, for each (modified) edge of the primitive, there is at least one sampling point (corner) for the region in question that passes the edge test for that edge (that lies inside (or on or inside, depending on the edge test being used) the edge).

Thus, for example, in the case of a triangular primitive, a render output region will be determined as being at least partially covered by a primitive by the rasterisation process if it is determined that the first edge of the primitive covers any corner of the region, that the second edge of the primitive covers any corner of the region, and that the third edge of the primitive covers any corner of the region (so the results of all the corners for each edge are in an embodiment "ORed", before the results for each edge are then "ANDed" to provide the overall edge coverage result).

In the case where an expanded bounding box surrounding a primitive has also been derived, e.g. at the primitive set-up stage (as discussed above), then the rasterisation process in an embodiment also determines whether the region of the render output is at least partially or completely within the bounding box (depending upon the coverage test being performed). This is in an embodiment done by testing the respective sampling points for the render output region to determine if at least one sampling point is within the bounding box (for partial coverage), and/or to determine if all the region's sampling points are within the bounding box (for complete coverage). Thus a region is in an embodiment only considered to be at least partially (or completely) covered by a primitive if (when) it is determined to also be at least partially (or completely) within the bounding box.

In one embodiment, the regions of the render output that are considered correspond to pixels to be generated (e.g. displayed). In another embodiment, the regions are larger than pixels and, e.g., and in an embodiment, each corresponds to an array of plural pixels (e.g. an array of 2×2, 4×4, 8×8 or 16×16 pixels).

It would be possible to test a modified primitive at one particular arrangement (level) of subdivision of the render output area into regions (e.g. to test at a pixel level, or a group of pixels level) only (and in one embodiment, that is what is done).

However, in an embodiment the rasterisation process of the technology described herein is performed as a "hierarchical" rasterisation process in which primitives are tested against progressively smaller regions of the graphics render output area down to a minimum region size (corresponding, in an embodiment, to single pixels), discarding any regions that are not (at least in part) determined to be covered (at least in part) by the primitive.

In an embodiment therefore, primitives can be, and are in an embodiment, tested by the rasterisation process against plural respective subdivisions of the sampling point grid, with each such grid subdivision representing a given subdivision of the render output area into a set of regions of a given size, and each different subdivision dividing the render output area into a set of regions that are different in size to the other subdivisions of the render output area.

In this case therefore, there will be a first subdivision of the sampling point grid consisting of groups of sampling points from the sampling point grid that each respectively correspond to a first subdivision of the render output area into regions, and at least one other subdivision of the sampling point grid consisting of groups of sampling points from the sampling point grid that each respectively correspond to a second, different subdivision of the render output area into regions (a subdivision of the render output area into regions that are different in size to the regions of the first subdivision of the render output area).

In one such embodiment, there is one sampling point grid subdivision in which the render output area is divided into regions corresponding to individual pixels, and at least one other sampling point grid subdivision in which the render output area is divided into regions that are bigger than individual pixels (and that in an embodiment correspond to an array of plural pixels). Thus in this case, there will be one subdivision of the sampling point grid into groups of sampling points in which each group corresponds to an individual pixel, and at least one other subdivision of the sampling point grid into groups of sampling points, in which each group of sampling points corresponds to a region that is bigger than an individual pixel.

In an embodiment, a modified primitive is first tested against a subdivision of the sampling point grid that subdivides the render output area into larger (e.g. the largest) sized regions, and then if any region in that sampling point grid subdivision is determined as being at least partially covered by the primitive, the primitive will then be tested against a sampling point grid subdivision representing a smaller subdivision of the render output area into regions, and so on, until the smallest region subdivision (e.g. pixel subdivision) of the render output area is reached.

The result of the rasterisation processing for a primitive can be used as desired, e.g., and in an embodiment, depending upon the nature of the rasterisation that is being performed and the purpose of that rasterisation. In an embodiment the result of the rasterisation processing of the modified primitive is used in the normal manner as would be done if rasterising without any modification of the primitives' edges in the manner of the technology described herein.

Thus, in the case of a hierarchical rasterisation operation when testing a primitive against larger regions of the render output, the result of the rasterisation processing is in an embodiment used to either discard the primitive for the region of the render output in question or to determine to subdivide the region of the render output in question into smaller regions and then test the primitive against those smaller regions.

Correspondingly, when testing a primitive against the smallest (or only) subdivision (e.g. pixel subdivision) of the render output area, in an embodiment the result of the rasterisation testing is used to generate (or not) appropriate fragments for further processing (e.g. rendering) of the primitive in respect of the region of the render output area in question. For example, for "outer coverage" testing, the primitive could be rasterised to fragments in the normal way. For "inner coverage" testing, a fully covered region (e.g. pixel) could be flagged as such to indicate that it is fully covered (e.g. for use in occlusion testing).

As discussed above, it would be possible to use modified edges for a primitive to perform both outer and inner coverage operations for conservative rasterisation. Thus two sets of modified edge information for a primitive could be determined, one representing an expanded version of the primitive, and the other representing a contracted version of the primitive, in an embodiment for use then, respectively, in outer and inner coverage conservative rasterisation processes.

However, the Applicants have also recognised that it would be possible to generate only a single modified version of a primitive (i.e. either an expanded or a contracted version of a primitive) and to then use that modified version of the primitive for both outer and inner coverage conservative rasterisation tests.

Accordingly, in an embodiment of the technology described herein, the primitive set-up stage operates to determine a single set (only one set) of modified edge information for a primitive, in the manner discussed above, with that modified version of the primitive then being used for performing both outer coverage conservative rasterisation testing for the primitive and inner coverage conservative rasterisation testing for the primitive.

This then has the advantage that the graphics processing pipeline is able to perform both the outer and inner coverage analysis without having to generate two "moved" edges (one offset inwardly and one offset outwardly) for each edge of a primitive to be tested.

In one such embodiment, only an expanded version of the primitive is determined. Thus, in an embodiment, modified edge information for a primitive that represents the edges for an expanded version of the primitive is used for performing both outer coverage conservative rasterisation testing for the primitive and inner coverage conservative rasterisation testing for the primitive.

Correspondingly, in an embodiment, the inner coverage testing for the conservative rasterisation process for a primitive is done using modified edge information for the primitive that represents the edges for an expanded version of the primitive (i.e. in which the edges of the primitive have been moved outwards from the originally determined edges, e.g. to allow for the potential error in the primitive's vertex positions, at the triangle set-up stage).

The Applicants have further recognised in this regard that when performing inner coverage testing using an expanded version of a primitive, then in order to perform that inner coverage testing appropriately, it would be desirable to test the expanded version of the primitive against a different arrangement of the sampling point grid to the arrangement that would be used when using the expanded version of the primitive for performing outer coverage testing (and vice-versa if performing outer coverage testing using a contracted version of a primitive).

Thus, in an embodiment, an expanded version of a primitive is used to perform inner coverage testing for conservative rasterisation, and the testing of the modified primitive's edges is done using a modified grid (array) of sampling positions as compared to the grid (array) of sampling positions that would be (that was) used when testing the modified primitive's edges for the purpose of outer coverage testing.

In other words, instead of determining modified edge information representing moved "inner" edges of the primitive for inner coverage testing, the modified outwardly expanded edges are still used, but the positions of the sampling points that are used to test against those edges are adjusted for the purposes of the inner coverage analysis.

This is advantageous because the inner coverage testing needs only to be performed at the lowest level of subdivision of the render output into regions (rather than, e.g., at multiple different levels of subdivision in the case of a hierarchical rasterisation arrangement), such that when determining a modified sampling point grid for the inner coverage testing, only one subdivision of the sampling point grid into render output regions needs to be modified.

Thus, in an embodiment, a single set of modified edge information representing an expanded version of the primitive is generated for a primitive, and that single set of modified edge information is tested against a sampling point grid having a particular arrangement of sampling point positions for outer coverage testing, and is also tested against a modified version of the sampling point grid to perform inner coverage testing for the primitive.

The grid of sampling positions to be used for testing a modified version of a primitive in these arrangements can be modified in any suitable and desired manner.

In the case where, as discussed above, respective groups of sampling points in the sampling point grid represent respective regions of the render output, then in an embodiment, the grid of sampling positions is modified by using for a, and in an embodiment for plural, and in an embodiment for each, respective region of the render output that is to be tested, a group of sampling positions for that region having modified positions as compared to the positions of the group of sampling positions for the region in the unmodified grid of sampling positions. In an embodiment, one or more, and in an embodiment each, sampling point of a given group of sampling points representing a region of the render output has a modified position in the modified sampling point group.

Thus, in an embodiment, for each render output region that is to be tested, a modified group of sampling positions is used for testing the modified version of the primitive. (It will be appreciated in this regard that where the positions of sampling points are modified for respective groups of sampling points that represent regions of the render output that are being tested, then a given sampling point in the unmodified sampling point grid that is common to plural regions of the render output may, and in an embodiment does, have a different modified position depending upon which render output region (and thus group of sampling positions in the unmodified sampling point grid) is being tested (and accordingly having its sampling point positions modified).)

In an embodiment, where each region is represented by a group of four sampling points at the corners of the region, at least one modified sampling point position is used for each corner of the region.

There could be only a single modified sampling point position for each sampling point in the group (e.g. region corner), or each sampling point could have plural (e.g., and in an embodiment, two) modified sampling point positions that are used for it.

In an embodiment, the group of sampling positions for a render output region (and in an embodiment the group of sampling positions for each render output region to be tested) is modified by moving the respective sampling positions of the group either outwardly (i.e. further apart) from their positions in the unmodified grid, or inwardly (i.e. closer together) from their positions in the unmodified grid.

In an embodiment, where an expanded version of a primitive is to be used for inner coverage testing, then the sampling positions in the group of sampling positions to be tested for a render output region are moved outwardly for the purpose of the inner coverage testing (such that the sampling positions used for a given render output region will be spaced further apart). (Correspondingly, in these cases, when using an expanded version of a primitive for outer coverage testing, an unmodified version of the sampling point group will be used.)

In an embodiment, the modified group of sampling positions that is used comprises a sampling point group in which each sampling point position in the unmodified group of sampling positions for the render output region in question has been offset by a particular, in an embodiment selected, in an embodiment predetermined, amount from the corresponding sampling point position in the unmodified version of the sampling point grid. The modified position for a (and in an embodiment for each) sampling point in a modified sampling point group is in an embodiment offset from the unmodified position of the sampling point by the particular offset amount in an axis direction (or both axis directions) of the sampling point grid.

In an embodiment, a, and in an embodiment each, modified group of sampling points representing a region (e.g. pixel) of the render output that is used comprises for each sampling point for the region in the unmodified sampling point group, two sampling points in the modified sampling point group, one sampling point representing the unmodified sampling point offset in one axis (e.g. the x-axis) direction by a particular, in an embodiment selected, in an embodiment predetermined, offset amount, and another sampling point representing the unmodified sampling point offset in the other (e.g. y) direction by the (same) particular offset amount. Thus where a group of four sampling points is used for each render output region (e.g. pixel), in an embodiment eight "offset" sampling points will be used, two for each sampling point, in the modified sampling point group.

Thus, in an embodiment, where, for example, the original sampling point grid comprises, for each region of the render output that is being considered, a group of four sampling positions each representing one corner of the region in question, the modified sampling point group for a given (and each) render output region to be considered comprises four pairs of sampling points (eight sampling points in total), with each pair of sampling points corresponding to a respective corner of the region, and comprising one sampling point for the corner offset in one (e.g. the x) axis direction, and another sampling point for the corner offset in the other (e.g. y) axis direction.

In these arrangements, in an embodiment the modified sampling points are all moved in the same relative direction (i.e. outwardly or inwardly) in the modified sampling position group. Thus, in the embodiment where an expanded version of a primitive is used with a modified sampling point groups for the purposes of testing inner coverage for the primitive, then for each region of a render output that is being considered, in an embodiment a modified sampling point group comprising four pairs of sampling points, each pair corresponding to a respective corner of the render output region, and comprising one sampling point for the corner offset outwardly in one (e.g. the x) axis direction, and another sampling point for the corner offset outwardly in the other (e.g. y) axis direction, is used.

The offset amount that is used for the modified positions of the sampling points in a modified sampling point group can be any suitable and desired offset amount, e.g. that can, and in an embodiment does, allow for one or more of, and in an embodiment all of, the modified version of the primitive that is being tested against the modified sampling point group, the type of testing being performed, and any errors in the dimensions of the primitive (e.g. rounding errors in the vertex positions for the primitive) that could affect the testing being performed (as discussed above).

In an embodiment, the offset amount for the sampling positions is based on (and in an embodiment comprises a component corresponding to) the amount by which the edges of the primitive were moved in the modified version of the primitive that is to be tested against the modified sampling point group (grid). This will, in effect, remove the offset of the primitive edges such that the primitive is, in effect, returned to its "snapped" size and configuration (i.e. to a size and configuration corresponding to that of the primitive edges originally determined based on the converted (snapped) vertex positions received at the primitive set-up stage).

In an embodiment, the offset amount for the sampling positions in the modified sampling point group also or instead (and in an embodiment also) includes a component that allows for any error or uncertainty in the dimensions of the primitive (as discussed above). This (further) offset amount in an embodiment corresponds to and is set in a similar manner to the offset amount for moving the primitive edges as discussed above (thus it is, in an embodiment, some fraction of the pixel spacing for the sampling point grid, and in an embodiment corresponds to either half or all of the vertex position spacing in the snapped vertex position grid or half or all of the sampling point spacing in the (unmodified) sampling point grid).

Thus, in an embodiment, the minimum amount (distance) by which the position of a sampling point will be offset (in an embodiment in one of the x and y directions) is equal to the sum of: the distance by which the primitive edges have been adjusted to define the modified version of the primitive that is being used, and the minimum offset value referred to above with respect to the modified edge information for accounting for (potential) rounding errors in the primitive's dimensions. Thus, for example, where the primitive's edges are modified, as discussed above, by offsetting them by $\frac{1}{526}$ of a pixel, in the embodiment the minimum amount (distance) by which a position of a sampling point will be offset will be $\frac{1}{256}$ of the pixel spacing (i.e. $\frac{1}{526}+\frac{1}{526}$ of the pixel spacing).

In one embodiment, the amount (distance) by which the position of a sampling point is offset (in an embodiment in one of the x and y directions) is equal to the sum of: the distance by which the primitive edges have been adjusted to define the modified version of the primitive that is being used, and the minimum offset value referred to above with respect to the modified edge information for accounting for (potential) rounding errors in the primitive's dimensions.

In another embodiment, the distance that the position of at least one or each sampling point is offset (adjusted) is in an embodiment equal to twice the distance by which the primitive edges have been moved.

Thus, in the case where an expanded version of a primitive is being used to perform inner coverage testing, the sampling points in a (and each) modified sampling point group that is to be used for the inner coverage testing with the expanded version of the primitive are in an embodiment moved outwardly (i.e. in a direction that is further from the position of the centre of the render output region that the group represents) in a or each axis direction from their positions in the unmodified sampling point grid by an amount that is at least equal to the sum of: the distance by which the primitive's edges were moved outwardly to form the expanded version of the primitive and the minimum offset value referred to above with respect to the modified edge information for accounting for (potential) rounding errors in the primitive's dimensions.

In this regard, it will be appreciated that the sampling points in this embodiment will be moved outwardly by the offset of the primitive edges for the outer coverage testing in order to effectively "remove" the offset of the primitive's edges in the outward direction, and also by at least the minimum offset value in order to effectively offset the primitive's edges by an appropriate amount in the inward direction.

As discussed above, in the case where the graphics processing pipeline is configured to perform "hierarchical" rasterisation, there may be a plurality of subdivisions of the sampling point grid against which a primitive could be tested. In such arrangements, it would be possible to determine a modified sampling point grid for plural (e.g. each) level of the rasterisation hierarchy, but in an embodiment, at least where inner coverage testing is to be performed using an expanded version of a primitive, then only a modified sampling point grid at the lowest level (e.g., and in an embodiment, at the pixel level) of the hierarchy is tested, e.g., and in an embodiment, for the inner coverage testing.

Thus, in an embodiment, the technology described herein will perform hierarchical rasterisation to determine the outer coverage of the primitives using the modified edge information determined at the primitive set-up stage, but test for inner coverage (if required) using a modified sampling point grid at the lowest level (greatest subdivision) of the render output region subdivision (using the minimum sized render output regions (e.g. pixels)).

The testing of a modified version of the primitive against a modified sampling point group for a render output region can be performed in any suitable and desired manner, e.g., and in an embodiment, in dependence upon the form of coverage testing that is being performed.

While it would be possible in this regard simply to test every (desired) sampling point in the modified sampling point group against the modified version of the primitive (and in one embodiment that is what is done), the Applicants have recognised that in certain circumstances it may not in fact be necessary to test each and every modified position sampling point for a given region of the render output against the modified version of the primitive.

For example, in the case of performing inner coverage testing using an expanded version of a primitive and a modified sampling point group for a render output region as discussed above in which each corner of the region of the render output has two modified position sampling points associated with it, the Applicants have recognised that, as will be discussed further below, the result of a coverage test against an appropriate one of the modified position sampling positions in the group can indicate, and be taken as indicating, the result of the coverage test for all of the sampling point positions in the modified sampling point group.

Thus it may in fact be only necessary to test a single offset sampling point position for each edge of the expanded primitive for the purposes of the inner coverage determination (as against testing all eight offset sampling points against each modified primitive edge). Thus the inner coverage analysis for a region of the render output can be performed by (and in an embodiment is performed by) testing each expanded primitive edge against a particular, in an embodiment selected, single offset sampling point of the group of one or more (offset) sampling points for the render output region in question.

Thus, in an embodiment of the technology described herein, when a modified version of a primitive is to be tested against a modified group of sampling positions representing a region of a render output being generated, the process comprises, for each edge of the modified primitive that is to be tested:

first selecting for the edge a single sampling point of the modified group of sampling points to be tested to determine whether the edge covers the region of the render output represented by the modified group of sampling points, then testing the primitive edge against the selected sampling point of the modified group of sampling points representing the region of the render output, and using the result of the testing of the selected sampling point against the primitive edge (i.e. whether the sampling point is determined to be covered by (inside, or on or inside) the edge) to determine whether the primitive edge covers the render output region represented by the modified group of sampling positions or not.

In an embodiment this testing is done for each edge of the modified primitive, and the region of the render output corresponding to the modified group of sampling points is determined to be at least partially or completely covered by the primitive (e.g. depending upon the test being performed) if each edge of the primitive is determined to cover its respective selected sampling point of the group of modified sampling points representing the render output region.

Thus in an embodiment, when testing and performing inner coverage testing using an expanded version of a primitive and modified sampling point groups that use respective pairs of offset sampling point positions for representing each corner of a given render output region, the expanded version of the primitive is tested for the purpose of the inner coverage determination by, for each edge of the expanded primitive, first selecting one (a single one) of the modified group of sampling points for the render output region to test against the edge, and then determining whether the selected sampling point passes the edge test for the edge (is inside (or on or inside, depending upon the edge test being used) the edge).

This is in an embodiment done for each edge of the expanded primitive, and the render output region in question is in an embodiment then determined as being fully covered by the primitive in question for the purposes of the inner coverage test when (and only when) for each edge (for all the edges) of the expanded primitive, the respective selected sampling point passes the edge test (is determined from the edge test to be covered by the primitive).

That is, the region (e.g. pixel) will be identified as being definitely covered by the primitive (irrespective of any rounding effects on the primitive's dimensions) only if each edge is determined to cover its respective selected offset sampling point for the region. If any one of the selected offset sampling points is not covered by the corresponding modified primitive edge, then it cannot be said for certain that the region is covered by the primitive.

The single offset sampling point that is selected to be used to test an edge of a modified primitive in these embodiments can be selected in any appropriate and desired manner.

The single offset sampling point that is selected to be used to test an edge of a modified primitive should be, and is in an embodiment, the single sampling point that if tested will be indicative of whether all the sampling points in the modified group of sampling points will be covered by the primitive edge or not. Thus, the selected single offset sampling point that is tested in an embodiment comprises the sampling point of the modified group of sampling points that is the most likely not to be on the inside of (or on or on the inside of) the primitive edge in question, i.e. is the sampling point of the modified group of sampling points that is most likely not to be covered by the edge in question.

In an embodiment, the offset sampling point that is selected to be tested during the inner coverage analysis for an edge is the offset sampling point that would be the first sampling point to be crossed as a line that is parallel to the edge is moved in the direction of the minor axis of the edge from a position outside all of the sampling points in the modified group of sampling points for the render output region towards the centre of the primitive to which the edge belongs.

In an embodiment, the offset sampling point that is to be tested is selected based on at least one characteristic of the edge in question. In an embodiment the offset sampling point that is to be tested is selected based on at least one of, and in an embodiment both of: the major axis direction of the (modified) primitive edge; and the slope of the (modified) primitive edge.

In an embodiment, each different combination of major axis direction and slope that a primitive edge can have is defined as corresponding to a particular offset sampling point position to test. In other words, each particular sampling point position will have a different combination of major axis direction and slope associated with it, so that the offset sampling point position to test can be selected based on the edges' major axis directions and slopes.

The slope and major axis direction of an edge can be determined in any suitable and desired manner.

Where the edges are defined by a line equation of the form $ax+by+c=0$, then the slope and major direction of an edge are in an embodiment determined from the values of the constants "a" and "b" in the line equation for the edge.

In an embodiment the absolute values (moduluses) of the constants "a" and "b" are compared and used to determine the major axis direction of the edge.

Correspondingly, the signs of the constants "a" and "b" in the line equation for the edge are in an embodiment used to determine the slope of the edge.

Thus, in an embodiment, where an edge is represented by a line equation of the form $ax+by+c=0$, then the absolute values and the signs of the constants "a" and "b" are used to select which offset sampling point representing a region of the render output is used to test against the edge for the purpose of coverage testing for that region of the render output.

In one such embodiment, the major axis direction of the modified primitive edge is used to select a subset of four offset sampling points of a set of eight offset sampling points representing the region of the render output being considered, and the particular combination of the signs of the constants "a" and "b" for the edge is used to select which one of those four offset sampling points is tested (and vice-versa).

The graphics processing pipeline can be triggered to operate in the manner of the technology described herein in any suitable and desired manner. For example, an application requiring graphics processing can indicate that processing in the manner of the technology described herein is desired, e.g. by issuing appropriate API function calls for this processing. In response to such calls for this processing from the application, the, e.g. driver for the graphics processor that is implementing the graphics processing pipeline, will cause the graphics processing pipeline to operate in the desired manner.

It would be possible in this regard to always perform both outer and inner coverage determination, or, for example, it could be indicated to the graphics processing pipeline whether outer or inner coverage, or both, testing is required, e.g. by the setting of appropriate indicators (e.g. flags). Such indicators could be set, e.g., for individual primitives and/or groups of plural primitives, e.g. to indicate whether the primitive or primitives should undergo outer and/or inner coverage testing or not.

As discussed above, in an embodiment of the technology described herein, an expanded version of a primitive is generated by modifying the positions of the primitive's edges and used to perform conservative rasterisation outer coverage testing for the primitive, and then the expanded version of the primitive is also used to perform inner coverage testing for the primitive (if required), but using modified groups of sampling positions (groups of sampling positions in which the sampling positions have modified positions) representing respective regions (e.g., and in an embodiment, pixels) of the render output. The inner coverage testing using the modified groups of sampling positions is in an embodiment performed in the manner discussed above.

Thus in an embodiment, the method of the technology described herein comprises (and the graphics processing pipeline is configured to):

the primitive set-up stage using the determined edge information to determine, for the primitive, modified edge information representing modified positions for the edges of the primitive corresponding to an expanded version of the primitive;

the rasterisation stage using the modified edge information for the primitive to determine, for at least one region of a graphics render output being generated, whether the primitive at least partially covers the region of the render output by:

determining using the modified edge information for the primitive whether the primitive covers at least one sampling point of a group of one or more sampling points from a sampling point grid representing the render output being generated that represents the region of the render output; and the rasterisation stage using the modified edge information for the primitive to determine, for at least one region of a graphics render output being generated, whether the primitive completely covers the region of the render output by:

determining using the modified edge information for the primitive whether the primitive covers at least one sampling point of a group of one or more sampling points that represents the region of the render output, the positions of the sampling points in the group of one or more sampling points representing the region of the render output being offset from the positions of the sampling points for the region of the render output in the sampling point grid representing the render output being generated.

In an embodiment the determination of whether a region of a graphics render output is completely covered by the primitive using the offset (modified) group of sampling positions representing the render output region is performed in the manner discussed above, i.e. in an embodiment by selecting for each edge of the primitive a single sampling position of the modified group of sampling positions for the render output region to test. Correspondingly, in the case of determining whether the primitive at least partially covers a region of the render output, in an embodiment the test further comprises determining whether at least one sampling point of the group of sampling points representing the region of the render output is covered by a bounding box (in an embodiment derived as discussed above) for the primitive.

It will be appreciated from the above that where each render output region is represented by a group of plural sampling positions, e.g. one for each corner of the render output region, then when testing the outer and inner coverage of a render output region, the rasterisation stage will, for each edge of the primitive, need to perform plural sampling point coverage tests for the outer coverage (e.g. one test for each sampling point of the group of sampling points representing the render output region), and at least one sampling point coverage test for the inner coverage (e.g. one test for a selected modified sampling point).

For example, where each group of sampling points contains four sampling points, e.g., set at the corners of the associated render output region, the rasterisation stage will perform for each edge: four coverage tests for the outer coverage, i.e. one test for each sampling point, and (at least) one coverage test for the inner coverage, i.e. one test for the selected offset sampling point, which equals five sampling point tests in total per region per edge of the primitive.

However, the Applicants have recognised that if the rasterisation stage is configured to process sets of plural contiguous render output regions in parallel (e.g. sets of 2×2 regions), then as the regions in such sets will share at least some sides, and thus also sampling points, with adjacent regions in the set, that can be used to reduce the overall number of sampling point coverage tests that will be performed to determine the coverage of the regions in the set of regions by a primitive, as compared to if each region was treated (tested) individually.

In particular, the Applicants have recognised that the regions in the set will have at least some common sampling points, and that those common sampling points can be tested only once for the set of plural regions for an edge when determining the outer coverage, rather than having to be tested once for each region within the set (i.e. the result of the coverage test for an edge for a common sampling point can be used in common for each region of the set that shares the sampling point in question, at least when determining outer coverage for a primitive).

For example where the render output area is processed in sets of 2×2 (so a total of four) regions, and four corner sampling points are used for each region, only nine sampling point edge tests could be performed for the outer coverage, and only (at least) four tests will need to be performed for the inner coverage, for an edge of the primitive. Thus in an embodiment a total of thirteen sampling point tests per set of four regions to be processed will be performed for each edge (per edge) of the primitive, rather than the (at least) twenty sampling point tests that would be the case if each region was tested (treated) separately.

Thus, in an embodiment, the rasterisation process is configured to (and operates to) test a set (and sets) of plural regions of the render output against an edge of a modified primitive in parallel (in one (and the same) test cycle).

This is in an embodiment done (repeated) for plural sets of plural render output regions.

In an embodiment the rasteriser is configured to test both outer and inner coverage for an edge for a set of plural regions in parallel (in a single cycle).

Correspondingly, in an embodiment, the rasterisation process is configured to (and operates to) test groups of sampling points representing a set of plural regions of the render output against an edge of a modified primitive in parallel (in one (in the same) test cycle).

Thus, in an embodiment, the determining using the modified edge information for a primitive whether the primitive covers at least one sampling point of a group of one or more sampling points from a sampling point grid representing the render output being generated that represents a region of the render output, comprises testing a "modified" edge of the primitive as indicated by the modified edge information for the primitive against sampling points of plural groups of one or more sampling points, each group representing a render output region of a set of plural, in an embodiment contiguous, regions of the render output, in parallel, and using the results of the testing to determine whether the primitive at least partially covers any of the regions of the render output in the set of regions of the render output (i.e. to determine the outer coverage of the primitive (to determine whether the primitive at least partially covers any of the render output regions)).

In one such embodiment, where the set of regions of the render output comprises a 2×2 set of regions, and each region is represented by a group of four sampling points, then the sampling points from the groups of sampling points representing the regions of the set comprises nine sampling points representing the corners of the regions.

In these arrangements, the sampling points from the plural groups of one or more sampling points representing the regions of the set of plural regions of the render output should, and in an embodiment do, include at least one sampling point (and in an embodiment plural sampling points) that are common to at least two of the groups of sampling points representing regions of the set (are common to at least two regions of the set). Those common (shared) sampling points are in an embodiment tested only once for the primitive edge, with the result of that single testing of the common sampling point being used in common for the regions that the sampling point is common to, for, or as part of, the determination of whether the regions that share the sampling point are at least partially covered by the primitive.

In an embodiment there is also tested for each region of the set, a sampling point or sampling points (and in an embodiment only a single sampling point) for the purpose of determining whether the primitive completely covers the region of the set (to determine the inner coverage of the primitive). Such inner coverage testing is in an embodiment performed in parallel with (in the same test cycle as) the outer coverage testing.

In an alternative embodiment, however, the inner coverage testing is performed after (and, e.g., conditionally based on the results of) the outer coverage testing. For example, if the result of the outer coverage testing indicates that all or none (or only one) of the sampling points used for the outer coverage testing are covered, then this can be, and in an embodiment is, taken as an indication that inner coverage testing is not needed for that primitive edge. Thus, according to an embodiment, the condition for performing the inner coverage testing for an edge is that more than one but less than all of the sampling points being tested for the outer coverage determination are covered by the primitive edge. Correspondingly, the condition for not performing the inner coverage testing for an edge is that none, only one or all of the sampling points being tested for the outer coverage determination are covered by the primitive edge.

In the case of determining the inner coverage, each region is in an embodiment tested separately (i.e. each region has its own sampling point or points that are tested and that are not shared or used in common with other regions of the set). As discussed above, in an embodiment a single, modified position, sampling point is tested for the purpose of determining the inner coverage for each region in the set.

Such testing of plural render output regions against an edge in parallel can, as discussed above, reduce the number of edge tests that will be performed to test the plural output regions, and thus, for example, the number of sample testing stages that are used (provided), for the rasterisation process, and/or the number of edge testing cycles that will be performed. Thus, it can allow less hardware to be used for the rasterisation process, e.g. by not having to provide additional sample testing stages ("testers") to facilitate additional sample testing cycles. Correspondingly, depending upon the architecture used by the graphics processing pipeline and how many sampling point tests can be performed per test cycle, it may allow all the sampling point tests (for an edge) for the inner coverage and outer coverage for the set of regions to be performed in a single test cycle.

The set (and each set) of plural regions of the render output that is tested in parallel may comprise any suitable set of plural regions of the render output that, e.g., and in an embodiment, share one or more sampling positions in the sampling point grid representing the render output being generated. In an embodiment the set of render output regions comprises a set of contiguous output regions, and in an embodiment a rectangular (including square) set of render output regions (particularly in the case where the render output regions themselves are rectangular (including square). In an embodiment, a (and in an embodiment each) set of render output regions comprises a 2×2 set of render output regions.

In an embodiment, the number of render output regions that are tested in parallel (in a single cycle) is selected and configured so as to allow the rasterisation stage to fully test a primitive edge for both outer and inner coverage in a single testing cycle. This will accordingly depend, e.g., upon the architecture and configuration of the rasterisation stage, and in particular, the number of edge sampling point tests that the rasterisation stage is configured to be able to perform in a single cycle.

For example, in the case where the rasterisation stage is configured to be able to perform sixteen sampling point coverage tests during a single testing cycle, then in an embodiment, particularly where each render output region is represented by a group of four sampling points, the sets of plural render output regions that are tested in parallel comprise sets of four render output regions, and in an embodiment sets of 2×2 render output regions.

Although the technology described herein has been described above primarily with reference to the processing of a single primitive, as will be appreciated by those skilled in the art, the technology described herein can be, and is in an embodiment, used for plural primitives, e.g., and in an embodiment, for each primitive of a set of plural primitives to be rendered. In this case, an appropriate set of vertices will be provided for each primitive (although primitives can share vertices, if desired), and the processing in the manner of the technology described herein will be performed for plural, and in an embodiment for each, primitive respectively. Thus, the technology described herein can be performed in respect of any one or more primitives generated for the render output being generated.

In an embodiment the primitives that are processed in the manner of the technology described herein are primitives that it has been determined will need to be rasterised for the purposes of generating the render output being generated, such as primitives that have been determined by the graphics processing pipeline (e.g. at an earlier testing stage) to fall within a view frustum of the whole or a region of the render output being generated.

It will be appreciated that the primitive set-up stage may be (and in an embodiment is) configured to generate other data in addition to the edge information for a primitive, e.g., and in an embodiment, based on the information representing the vertices defining a primitive to be rendered by the graphics processing pipeline. This other information may include, for example, depth equations and barycentric interpolation equations for the primitive.

The technology described herein can be used for any form of output that the graphics processing pipeline may be being used to generate. In an embodiment it is used when a graphics processing pipeline is being used to generate images for display, but it can be used for any other form of graphics processing output, such as graphics textures in a render-to-texture operation, etc., that a graphics processing pipeline may produce, as desired.

The graphics processing pipeline can be implemented as desired. In an embodiment it is implemented by means of a graphics processor that implements and executes the graphics processing pipeline. In an embodiment, the graphics processing pipeline (and graphics processor) is part of an overall graphics processing system that includes a host processor that executes applications that can require graphics processing by the graphics processing pipeline and graphics processor.

The technology described herein can be used in and with any suitable and desired graphics processing system and pipeline.

The technology described herein is particularly suitable for use with tiled renderers (tile-based graphics processing systems). Thus, in an embodiment, the graphics processing pipeline is a tiled-based graphics processing pipeline.

The graphics processing pipeline can include, and in an embodiment does include, any one or more, and in an embodiment all, of the processing stages that a graphics processing pipeline can normally include. Thus, for example, the graphics processing pipeline in an embodiment includes a primitive set-up stage, a rasteriser and a renderer. In an embodiment the renderer is in the form of or includes a programmable fragment shader.

The graphics processing pipeline in an embodiment also comprises one or more programmable shading stages, such as one or more of, and in an embodiment all of, a vertex shading stage, a hull shader, a tessellation stage (e.g. where tessellation is performed by executing a shader program), a domain (evaluation) shading stage (shader), a geometry shading stage (shader), and a fragment shader.

The graphics processing pipeline may also contain any other suitable and desired processing stages that a graphics processing pipeline may contain such as a depth (or depth and stencil) tester(s), a blender, a tile buffer or buffers, a write out unit etc.

The various processing stages can be implemented as desired. They are in an embodiment implemented by means of appropriate processing circuitry, which may be fixed function processing circuitry (hardware) or programmable processing circuitry (hardware), as desired.

In an embodiment, the various functions of the technology described herein are carried out on a single graphics processing platform that generates and outputs the rendered fragment data that is, e.g., written to a frame buffer for a display device.

The graphics processing pipeline and processor in an embodiment also comprises, and/or is in communication with, one or more memories and/or memory devices that store the data described herein, and/or that store software for performing the processes described herein. The graphics processing pipeline may also be in communication with a host microprocessor, and/or with a display for displaying images based on the data generated by the graphics processing pipeline.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The technology described herein and present embodiments relate to computer graphics processing.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

Graphics processing is typically carried out in a pipelined fashion, with one or more pipeline stages operating on the data to generate the final render output, e.g. frame that is displayed.

FIG. 1 shows an exemplary graphics processing pipeline 10.

The graphics processing pipeline 10 shown in FIG. 1 is a tile-based renderer and will thus produce tiles of a render output data array, such as an output frame to be generated.

FIG. 1 shows the main elements and pipeline stages of the graphics processing pipeline. As will be appreciated by those skilled in the art, there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

The graphics processing pipeline 10 shown in FIG. 1 includes a number of stages, including vertex shader 200, a hull shader 201, a tesselator 202, a domain shader 203, a geometry shader 204, a tiler 205, a rasterisation stage 206, an early Z (depth) and stencil test stage 207, a renderer in the form of a fragment shading stage 208, a late Z (depth) and stencil test stage 209, a blending stage 210, a tile buffer 211 and a downsampling and writeout (multisample resolve) stage 212.

The vertex shader 200 takes the input data values (vertex attribute values) associated with the vertices, etc., defined for the output to be generated, and processes those data values to generate a set of corresponding "vertex shaded" output data values for use by subsequent stages of the graphics processing pipeline 1.

For a given output to be generated by the graphics processing pipeline, there will typically be a set of vertices defined for the output in question. The primitives to be processed for the output will then be indicated as comprising given vertices in the set of vertices for the graphics processing output being generated.

The vertex shading operation operates to transform the attributes for each vertex into a desired form for the subsequent graphics processing operations. This may comprise, for example, transforming vertex position attribute values from the world or user space that they are initially defined for to the screen space that the output of the graphics processing system is to be displayed in, modifying the input data to take account of the effect of lighting in the image to be rendered, etc.

As mentioned above, the, e.g., vertex shading operation may also convert the originally defined vertex position coordinates to a different, e.g., lower precision, form to be used later on in the graphics processing pipeline.

The hull shader 201 performs operations on sets of patch control points and generates additional data known as patch constants. The tessellation stage 202 subdivides geometry to create higher-order representations of the hull, and the domain shader 203 performs operations on vertices output by the tessellation stage (similar to a vertex shader). The geometry shader 204 may (if run) generate primitives such as a triangles, points or lines for processing.

Once all the primitives to be rendered have been appropriately processed, e.g. transformed, and/or, e.g., generated by the geometry shader, the tiler 205 then determines which primitives need to be processed for each tile that the render output has been divided into for processing purposes. To do this, the tiler 205 compares the location of each primitive to be processed with the tile positions, and adds the primitive to a respective primitive list for each tile that it determines the primitive could (potentially) fall within. Any suitable and desired technique for sorting and binning primitives into tile lists, such as exact binning, or bounding box binning or anything in between, can be used for the tiling process.

Where bounding box binning is used, in the present embodiment, when conservative rasterisation is being performed, the tiler 205 generates and uses as the bounding box for a primitive for the tiling process, a bounding box having dimensions and a position that is based on the "snapped" vertex positions for the primitive, plus an offset amount (error margin) in an outward direction in both directions along each axis of the sampling point grid to be used later on in the graphics processing pipeline. This will be discussed further below.

Once the tiler has completed the preparation of the primitive tile lists (lists of primitives to be processed for each tile), then each tile can be rendered.

To do this, each tile is processed by the graphics processing pipeline stages shown in FIG. 1 that follow the tiler 205.

Thus, when a given tile is being processed, each primitive that is to be processed for that tile (that is listed in a tile list for that tile) is passed to the rasteriser 206.

The rasterisation stage 206 of the graphics processing pipeline 10 operates to rasterise the primitives into individual graphics fragments for processing.

To do this, the rasteriser 206, particularly a primitive set-up stage 81 of the rasteriser 206, operates to determine, from the vertex shaded vertices provided to the primitive set-up stage 81, edge information representing each primitive edge of a primitive to be rasterised. This edge information is then passed to a rasterisation stage 82 of the rasteriser 206, which rasterises the primitive to sampling points and generates graphics fragments having appropriate positions (representing appropriate sampling positions) for rendering the primitive.

(It will be appreciated that although FIG. 1 shows the primitive set-up stage 81 being part of a single rasterisation unit (the rasteriser 206 of FIG. 1), this is not required. It is possible for the primitive set-up stage to be separate from the rasteriser 206, e.g. at a stage of the graphics processing pipeline that is (e.g. immediately) before the rasteriser 206, but after the tiler 205.)

The fragments generated by the rasteriser are then sent onwards to the rest of the pipeline for processing.

The early Z/stencil stage 207 performs a Z (depth) test on fragments it receives from the rasteriser 206, to see if any fragments can be discarded (culled) at this stage. To do this, it compares the depth values of (associated with) fragments issuing from the rasteriser 206 with the depth values of fragments that have already been rendered (these depth values are stored in a depth (Z) buffer that is part of the tile buffer 211) to determine whether the new fragments will be occluded by fragments that have already been rendered (or not). At the same time, an early stencil test is carried out.

Fragments that pass the fragment early Z and stencil test stage 207 are then sent to the fragment shading stage 208. The fragment shading stage 208 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 208 is in the form of a shader pipeline (a programmable fragment shader).

There is then a "late" fragment Z and stencil test stage 209, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 211 to determine whether the fragment data for the new fragments should replace the fragment data of the fragments that have already been rendered, by comparing the depth values of (associated with) fragments issuing from the fragment shading stage 208 with the depth values of fragments that have already been rendered (as stored in the depth buffer). This late fragment depth and stencil test stage 209 also carries out any necessary "late" alpha and/or stencil tests on the fragments.

The fragments that pass the late fragment test stage 209 are then subjected to, if required, any necessary blending operations with fragments already stored in the tile buffer 211 in the blender 210. Any other remaining operations necessary on the fragments, such as dither, etc. (not shown) are also carried out at this stage.

Finally, the (blended) output fragment data (values) are written to the tile buffer 211 from where they can, for example, be output to a frame buffer 213 for display. The depth value for an output fragment is also written appropriately to a Z-buffer within the tile buffer 211. (The tile buffer stores colour and depth buffers that store an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4$x$ multisampling is being used).

The tile buffer is provided as part of RAM that is located on (local to) the graphics processing pipeline (chip).

The data from the tile buffer 211 is input to a downsampling (multisample resolve) write out unit 212, and thence output (written back) to an external memory output buffer, such as a frame buffer 213 of a display device (not shown). (The display device could comprise, e.g., a display comprising an array of pixels, such as a computer monitor or a printer.)

The downsampling and writeout unit 212 downsamples the fragment data stored in the tile buffer 211 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer 213 in a main memory) for storage, the next tile is then processed, and so on, until sufficient tiles have been processed to generate the entire render output (e.g. frame (image) to be displayed). The process is then repeated for the next render output (e.g. frame) and so on.

Other arrangements for a graphics processing pipeline would, of course, be possible.

The graphics processing pipeline as illustrated in FIG. 1 will be executed on and implemented by an appropriate graphics processing unit (GPU) (graphics processor) that includes the necessary functional units, processing circuitry, etc., operable to execute the graphics processing pipeline stages.

In order to control a graphics processor (graphics processing unit) that is implementing a graphics processing pipeline to perform the desired graphics processing pipeline operations, the graphics processor will typically receive commands and data from a driver, e.g. executing on the host processor, that indicates to the graphics processor the operations that it is to carry out and the data to be used for those operations.

Figure 2:
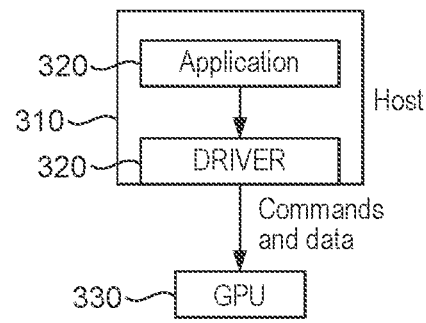
FIG. 2 illustrates schematically a typical computer graphics processing system.

Accordingly, as shown in FIG. 2 (which shows a typical computer graphics processing system), an application 320, such as a game, executing on a host processor 310 that requires graphics processing operations to be performed by an associated graphics processing unit (graphics processing pipeline) 330, will generate appropriate API (Application Programming Interface) calls that are interpreted by a driver 340 for the graphics processor 330 that is running on the host processor 310 to generate appropriate instructions to the graphics processor 330 to generate graphics output required by the application 320. To facilitate this, a set of instructions will be provided to the graphics processor 330 in response to instructions from the application 320 running on the host system 310 for graphics output (e.g. to generate a frame to be displayed).

As discussed above, the technology described herein relates in particular to the operation of a graphics processing pipeline, such as the pipeline illustrated in FIG. 1, when performing so-called "conservative rasterisation".

Conservative rasterisation is a form of rasterisation that is performed to try to take account of and to reduce the effect of, any rounding errors in the positions and dimensions of primitives that are rasterised as compared, e.g., to the positions and dimensions of the primitives as defined in and by the application that requires the graphics processing. As discussed above, such errors in a primitive's dimensions can arise because, e.g., the vertex coordinates from a primitive may be converted from a floating point format to a fixed point format for the rasterisation process, etc.

As discussed above, there are usually two aspects to conservative rasterisation: "outer coverage" which is to identify those render output regions (e.g. pixels) that are definitely outside a primitive irrespective of any rounding effects for the primitive's position; and "inner coverage" which is to identify those render output regions (e.g. pixels) that are definitely covered by a primitive irrespective of any rounding effects on the primitive's position.

Figure 3:
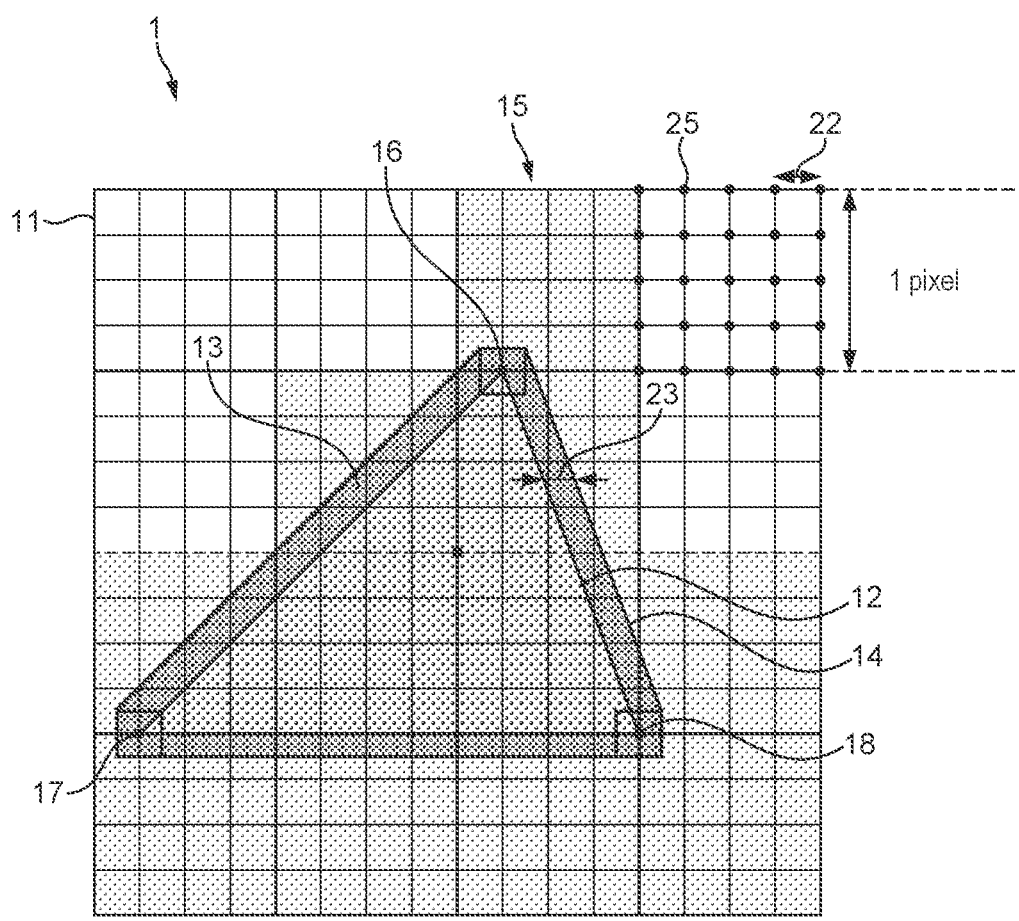
FIG. 3 illustrates schematically the general concept behind conservative rasterisation when performing outer coverage determination.

FIG. 3 illustrates the general concept behind conservative rasterisation when performing outer coverage determination.

FIG. 3 shows an exemplary array 1 of sixteen render output regions 11, in this case corresponding to pixels, of a render output to be generated.

As shown in FIG. 3, the pixel array 1 is overlaid by a grid of sampling points 25 that can be and will be used by the rasterisation stage to test which regions (e.g. pixels) of the render output are covered by primitives. The sampling points in the grid are spaced 22 by a given fraction of the pixel spacing (of the size of the pixel). In FIG. 3, for clarity, the sampling points in the grid are shown as being spaced by ¼ of pixel. In practice, much higher resolution sampling point grids may be used, for example having spacings corresponding to the spacing between adjacent vertex positions in the "snapped" vertex position grid, e.g. spacings of 1/256 of a pixel. Also, FIG. 3 only shows a few of the sampling points 25 of the grid, for clarity.

FIG. 3 also shows an exemplary primitive 12 (in the form of a triangle) that is to be rasterised and rendered in order to generate final pixel data representing that primitive. FIG. 3 shows the primitive 12 after its vertices 16, 17, 18 have been converted (snapped) from their originally defined (e.g. floating point) positions to the (e.g. fixed point format) lower precision vertex position grid.

The rasterisation process will map the (position of the) primitive 12 to the array of pixels 11 to determine which pixels in the pixel array 11 are at least partially covered by the primitive 12. The rasterisation process will generate graphics fragments that represent the primitive 12 for each pixel that is determined to be at least partially covered (which fragments are then rendered to determine the appearance each covered pixel should have (e.g. in terms of its colour, etc.) to represent the primitive 12 at that pixel).

In the example shown in FIG. 3, as mentioned above, errors may be introduced in the exact dimensions of the primitive 12 when its original vertices are snapped to the lower precision vertex position grid. As such, the "snapped" positions of the vertices 16, 17, 18 of the primitive 12 shown in FIG. 3 may not correspond exactly to the positions of the vertices of the primitive before the vertices were converted to the lower precision, e.g. fixed-point, coordinate form for the rasterisation process. This "uncertainty" in the exact dimensions of the primitive 12 is illustrated in FIG. 3 by the shaded region 13 (a so-called "uncertainty region") around the primitive 12. The uncertainty region 13 includes all the possible pixel positions that the primitive could at least partially cover allowing for potential errors in the dimensions of the primitive 12. The outer edge 14 of the uncertainty region 13 represents the maximum potential error in the "outward" ("expanded") direction in the dimensions of the primitive 12.

As can be seen in FIG. 3, if the potential error 13 in the primitive's dimensions is not accounted for (such that the primitive 12 is rasterised without defining an uncertainty region), it is possible for pixel 15 to be flagged as not being covered by the primitive 12, given that the "snapped" version of the primitive 12 does not extend into the region corresponding to pixel 15.

However, when the potential error in the primitive dimensions is allowed for during the rasterisation process, e.g. by expanding the edges of the primitive to account for the potential error 13 in the position of the primitive 12, it can be seen that the primitive 12 would be identified as (potentially) extending into the region corresponding to pixel 15, such that a fragment or fragments representing the primitive will be generated for pixel 15. This is clear in FIG. 3 by the fact that the uncertainty region 13 extends into the region corresponding to pixel 15.

Conservative rasterisation outer coverage testing aims to generate fragments for all pixels that are at least partially covered by a primitive, taking into account potential errors in the primitive's dimensions. Thus if conservative rasterisation is used to rasterise the primitive in the arrangement of FIG. 3, all of the pixels that are at least partly covered by the outer edges 14 of the uncertainty region 13 will be flagged as being covered by the primitive 12. These covered pixels are illustrated by the large gray squares in FIG. 3.

In the present embodiment, the graphics processing pipeline is configured to perform conservative outer coverage rasterisation by generating at the primitive set-up stage, a modified (and in particular expanded) version of a primitive to be rasterised, by moving the edges of the primitive as determined from the "snapped" vertex positions provided to the primitive set-up stage as representing the primitive in an outward direction (away from the position of the centre of the primitive) relative to those determined edges to generate an appropriate uncertainty region 13 that takes account of potential errors in the primitive's dimensions.

To do this, the primitive set-up stage 81 of the rasteriser 206 (of the graphics processing pipeline) first determines the positions of the primitive's edges using the "snapped" vertex positions for the primitive, and then determines therefrom new, modified edge information, which represents the primitive's edges that have been moved outwards (away from the position of the centre of the primitive relative to the initially determined primitive edges).

In particular, the primitive set-up stage 81 determines line equations of the form $ax+by+c=0$ for the primitive's edges using the vertex information for the primitive 12, determines the major axis of each edge from its edge function (by considering the absolute magnitudes (modulus) of the coefficients a and b), and then moves each edge outwards in the minor direction of the edge by a selected amount that corresponds to a desired "uncertainty" offset, to provide a modified, expanded version of the primitive.

The offset amount is, in the present embodiments, selected and set so as to (try to) take account of any potential errors in the dimensions of the primitive as compared to if the primitive was defined using the vertex positions (e.g. in floating point format) as originally defined for the primitive.

Figure 4:
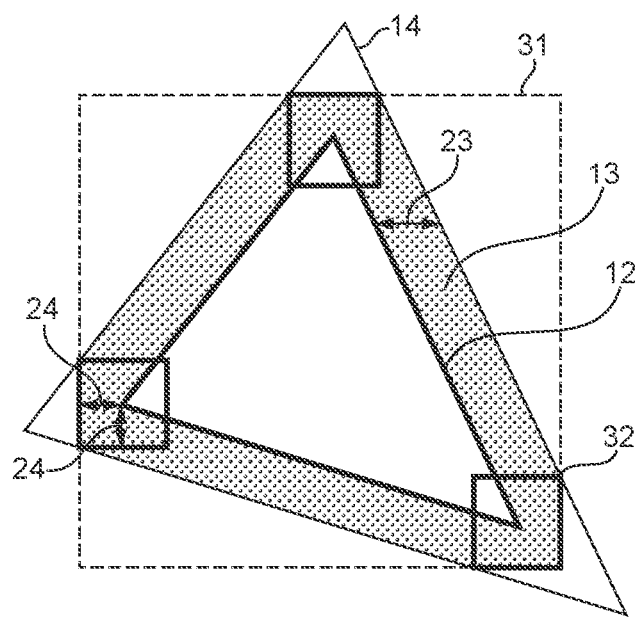
FIG. 4 illustrates schematically an expanded primitive in accordance with an embodiment of the technology described herein.

FIG. 4 illustrates this, and shows the originally determined primitive 12, together with a modified, expanded version of the primitive 14, in which each primitive edge has been moved outwardly so as to create an uncertainty region 13 surrounding the primitive 12.

As shown in FIG. 4, each primitive edge is moved outwardly in its minor axis direction by an offset amount 23, so as to create an expanded version 14 of the primitive having an uncertainty region 13.

The amount 23 by which a primitive edge is offset will, e.g., depend on how the originally defined vertex positions are snapped to the vertex position grid.

For example, in some arrangements the originally defined vertices are snapped to the vertex position grid such that each position is rounded to its nearest vertex position in the grid, and the maximum error introduced in the position of the "snapped" vertex is half the distance separating two adjacent vertex positions in the grid. Thus, in such arrangements, the minimum amount by which the position of a primitive edge should be offset is equal to half the distance separating two adjacent vertex positions in the grid.

Other arrangements for snapping the originally defined vertex positions to the vertex position grid would, of course, be possible, and in such arrangements the primitive offset amount 23 should be set accordingly.

The offset amount 23 is set in the present embodiment equal to half of the distance 22 separating adjacent vertex positions in the vertex position grid. This corresponds to the smallest offset amount that is still large enough to encompass any potential error in the position of a vertex of the primitive 12 in the outward direction.

(In the case where the rasteriser uses a 16.8 fixed point vertex position coordinate representation, and floating point vertex coordinates are snapped to the 16.8 fixed point coordinates, such that the converted (snapped) vertex position spacing will be $1/256$ of a pixel, then the minimum offset value will be $1/512$ of a pixel.)

The offset 23 could be greater than half of the distance 22 separating adjacent vertex positions in the vertex position grid, if desired. For example, in other embodiments the primitive edges are offset by twice the smallest offset amount that is still large enough to encompass any potential error in the position of a vertex of the primitive 12 in the minor direction, e.g. $1/256$ of a pixel.

As shown in FIG. 4, an effect of outwardly offsetting the primitive's edges is that the apexes (i.e. the effective vertices) of the modified primitive 14 may be located at positions that are further away from the snapped vertex positions (the positions of the vertices used by the primitive set-up stage to determine the initial edge information) than is necessary to properly provide the desired uncertainty region around the primitive.

To allow for this, as shown in FIG. 4, the primitive set-up stage also constructs a bounding box 31 around the expanded primitive 14 that represents the desired outer limits of the uncertainty region at the primitive's vertex positions. This then has the effect, as shown in FIG. 4, of removing ("clipping") any parts of the expanded primitive 14 that extend from the snapped vertices by more than the desired uncertainty offset amount.

As can be seen from FIG. 4, the bounding box 31 is constructed by expanding a bounding box that corresponds to the unmodified primitive 12 by an appropriate uncertainty offset amount 24 in each axis direction, such that each vertex is accordingly then surrounded by an outward uncertainty region that corresponds to the desired uncertainty offset amount (but is not bigger than the offset uncertainty amount). In the present embodiment, the uncertainty offset amount 24 in each axis direction corresponds to the minimum offset value, e.g. $1/512$ of a pixel.

(As discussed above, such an expanded bounding box 31 may also be used when tiling the primitive (rather than using a bounding box that is configured exactly to the size of the primitive 12 (to the non-expanded version of the primitive)), and in such cases the tiling stage of the graphics processing pipeline may be configured to construct the bounding box for that purpose.)

Once the expanded version 14 of the primitive and its bounding box 31 have been determined, then the expanded version 14 of the primitive and its bounding box 31 are rasterised against the sampling point grid to determine which pixels the expanded version 14 of the primitive 12 at least partially covers. If the expanded version 14 of the primitive 12 is determined to at least partially cover a pixel, appropriate fragments for rendering the primitive 12 are generated for the pixel.

To do this, respective regions of the render output are represented by groups of plural sampling points (in this case comprising a sampling point at each corner of the region in question), and for each such group of sampling points that is to be tested for a primitive, the edges of the expanded version 14 of the primitive are tested to determine whether the primitive covers any of the sampling points in the group in question. It is also determined if at least one sampling point of the group falls within the bounding box 31 for the expanded version 14 of the primitive.

In the present embodiment, the rasterisation stage 206 is a hierarchical rasteriser that operates to iteratively test a primitive against progressively smaller square regions of the render output area, down to a minimum region size corresponding to a single pixel (which may e.g. be rasterised to a 2×2 group of fragments), discarding any regions that are not (at least in part) covered by the primitive.

Figure 5:
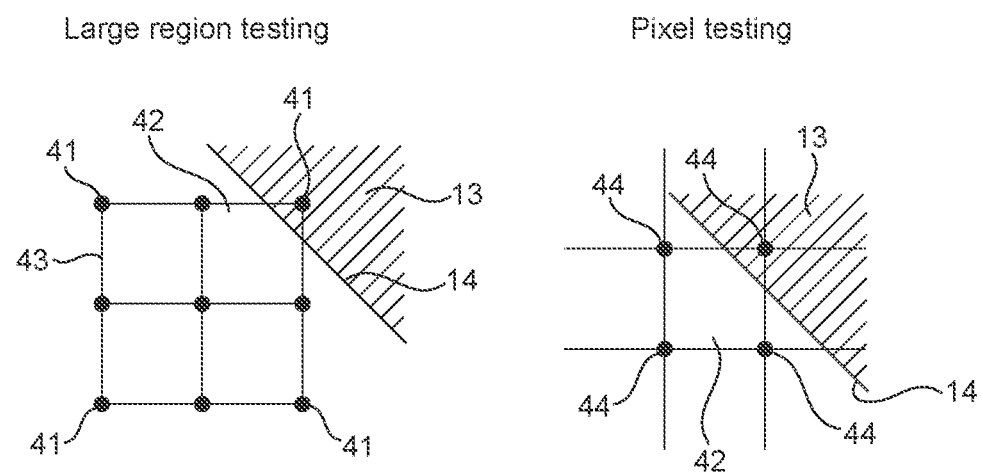
FIG. 5 illustrates schematically a method of performing outer coverage testing of the conservative rasterisation process in a hierarchical fashion, according to embodiments of the technology described herein.

FIG. 5 illustrates this, and shows the respective testing of a larger region 43 of the render output that covers an area of 2×2 pixels, together with the subsequent testing of an individual pixel 42.

The rasteriser will first test the modified edges 14 for a primitive (which outlines the uncertainty region 13 around the primitive) against the larger region 43 of the render output to see if the larger region 43 of the render output is at least partially covered by the expanded version of the primitive.

If it is found that the larger region 43 is not covered by the primitive at all, then the region 43 will not be processed further in respect of the primitive in question (i.e. the entire region is discarded for the primitive in question), and another (the next) larger region is tested against the primitive, and so on.

On the other hand, if it is found that the larger region 43 is at least partially covered by the primitive, then the region 43 will be subdivided into its smaller regions (in this example pixels), and each covered smaller region (pixel) is then correspondingly tested against the primitive.

Thus, as in the example illustrated in FIG. 5, the primitive does at least partially cover one of the pixels (pixel 42) of the set of pixels of the render output that the large region 43 encompasses (i.e. the primitive is found to cover, at least in part, the larger region 43), the larger region 43 is subdivided into its individual pixels, and the covered pixel 42 is then tested against the expanded version of the primitive. As the pixel 42 corresponds to the minimum render output region size, i.e. a pixel patch size, the primitive is rasterised to fragments for rendering for the pixel 42 in dependence on its determined coverage of the pixel 42.

In the present embodiment, each region of the render output that is tested against the expanded version of the primitive is represented by a set of four sampling positions corresponding to the corners of the region. Thus, for the larger region 43, the four corner sampling points 41 are tested, and for the pixel 42, the four corner sampling points 44 are tested.

(Setting the sampling points to the corners of the render output region is advantageous in that it helps to ensure that a region will be deemed to be at least partially covered, even if a primitive covers only a small part of the region.)

Then, to determine whether a primitive at least partially covers a region of the render output (i.e. to perform the outer coverage test), each edge of the expanded primitive 14 is tested against the sampling points representing the corners of the render output region, and the bounding box 31 of the expanded version of the primitive is tested against the group of sampling points representing the render output region.

A render output region is determined as being at least partially covered by a primitive if each modified edge 14 for the primitive covers at least one sampling point for (i.e. at least one corner of) the region of the render output, and at least one sampling point (i.e. corner) of the render output region is within the bounding box 31 for the expanded version of the primitive. (Thus, the edge tests for all the corners of the render output region are ORed together for each edge, before the edge results are ANDed.)

In the example shown in FIG. 5, the rasterisation stage will determine that pixel 42 is partially covered by the primitive, and will accordingly generate fragment(s) representing the primitive for that pixel 42 for rendering.

The above describes the performance of conservative rasterisation outer coverage testing in an embodiment of the technology described herein.

As discussed above, another aspect of conservative rasterisation is to perform "inner coverage" testing, which is to identify the regions of the render output that are definitely covered by a primitive irrespective of any potential errors in the primitive's dimensions. This may be useful for, for example, occlusion culling.

Conservative rasterisation inner coverage testing aims to determine the regions of the render output (e.g. pixels) that are definitely covered by a primitive in question, irrespective of any potential error in the primitive's dimensions. For example, an appropriate stage of the graphics processing pipeline will in embodiments be configured to store and manage appropriate flag data for a primitive, indicating which regions of the render output are definitely fully covered by the primitive. The flag data may then be used later on in the graphics processing pipeline for use in e.g. occlusion or collision detection operations.

Figure 6:
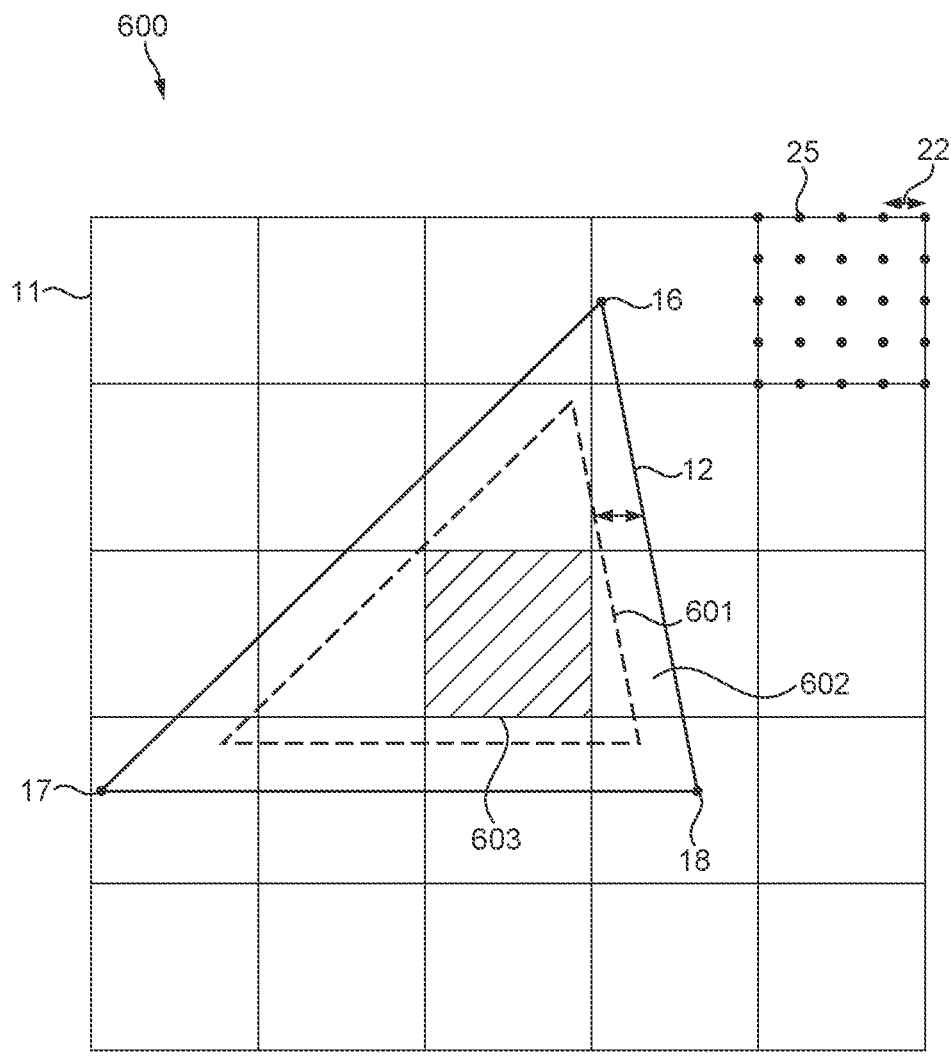
FIG. 6 illustrates schematically the general concept behind conservative rasterisation when performing inner coverage determination.

The general concept behind conservative rasterisation inner coverage determination is illustrated in FIG. 6, which shows an exemplary array 600 of render output regions 11, in this case corresponding to pixels, of a render output to be generated.

Similarly to FIG. 3, FIG. 6 also shows that the array 600 is overlaid by a grid of sampling points 25 that can be and will be used by the rasterisation stage to test which pixels 11 of the render output are covered by a primitive 12. The sampling points in the grid are again spaced 22 by a given fraction of the pixel spacing (of the size of the pixel), corresponding in FIG. 6 to ¼ of a pixel.

As mentioned above, errors may be introduced in the exact dimensions of the primitive 12. This "uncertainty" error in the exact dimensions of the primitive 12 is illustrated in FIG. 6 by the region 602 (a so-called "uncertainty region") within the primitive 12. Here, the uncertainty region 602 includes all the possible positions within the primitive 12 that the edges of the primitive 12 may round to when converting the primitive's vertex positions for processing.

The inner edges 601 of the uncertainty region 602 represent the maximum potential error in the "inward" ("contracted") direction in the dimensions of the primitive 12.

In order to determine the pixels 11 of the render output that are covered by primitive 12 irrespective of any potential error in the primitive's dimensions, the inner edges 601 of the uncertainty region 602 are mapped to the array 600 of pixels 11, and each pixel 11 that is fully covered by the (modified) inner edges 601 of primitive 12 will be flagged as being covered. In the arrangement of FIG. 6, it can be seen that only one of the pixels 603 is fully covered by the (modified) inner edges 601 of primitive 12.

While the inner coverage testing illustrated in FIG. 6 has been described with respect to mapping modified (moved inwardly) inner edges 601 of the primitive 12 to the array 600 of pixels 11 to perform the inner coverage testing, in the present embodiments, instead of calculating the inner edges 601 for the primitive 12 and using that for the inner coverage testing, the rasterisation stage performs inner coverage analysis for a pixel (or any other region, if desired) of the render output still using the modified edge information representing an expanded version 14 of the primitive 12 that was used for the outer coverage testing.

However, in contrast to what is done for the outer coverage analysis where the expanded version 14 of the primitive is tested against a group of sampling points corresponding to the corners of the pixel (or other region) of the render output being considered, the inner coverage analysis tests the expanded version 14 of the primitive against a group of sampling positions having modified positions as compared to the sampling points set to the corners of the pixel (render output region) that is used for the outer coverage analysis. The sampling points are offset to account for the fact that an expanded version of the primitive is being tested for the inner coverage, and so as to, in effect, still generate an inner "uncertainty" region for the primitive, such as the inner uncertainty region 602 of FIG. 6.

In particular, for the inner coverage analysis, the sampling points for a pixel (or other region) are offset outwardly from the pixel itself (i.e. in a direction that is further from the position of the centre of the pixel), and then those offset sampling points are tested against the modified edges for the expanded version 14 of the primitive that were determined and used for the outer coverage rasterisation.

In particular, for each corner of the pixel (or other region) to be tested for inner coverage, two offset sampling points are created for the inner coverage analysis: one sampling point representing the original sampling point at the corner offset in the x-axis direction, and another sampling point representing the original sampling point at the corner offset in the y-axis direction.

Figure 7:
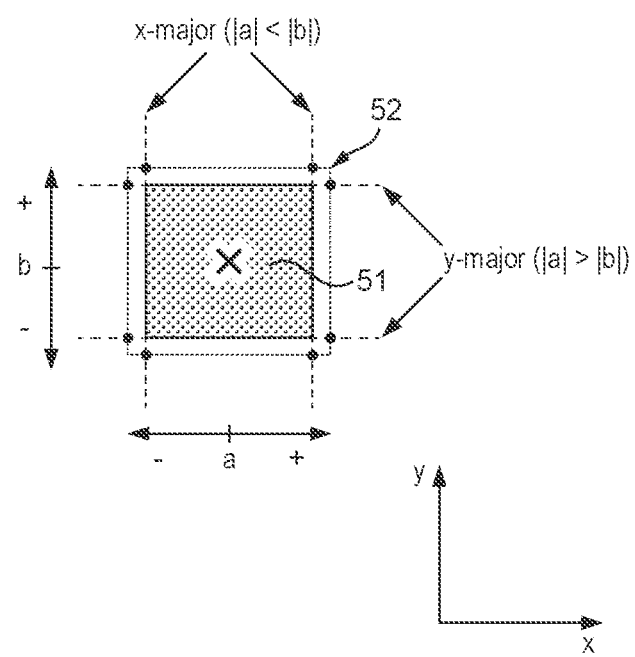
FIG. 7 illustrates schematically a method of performing the inner coverage analysis of the conservative rasterisation process according to an embodiment of the technology described herein.

FIG. 7 illustrates this, and shows the modified group of sampling points 52 for a pixel 51 that will be used for inner coverage testing for the pixel 51. It can be seen in FIG. 7 that the pixel 51 will have four pairs of offset sampling points (providing eight new sampling points), one pair for each original corner sampling point, formed for the inner coverage analysis.

As can be seen in FIG. 7, all of the sampling points are offset outwardly by the same distance. As mentioned above, this offset distance is set in the present embodiment to account for the fact that an expanded version of the primitive is being tested for the inner coverage, and so as to, in effect, generate an inner "uncertainty" region for the primitive because inner coverage is being tested.

Thus, in the present embodiment, the sampling points are offset outwardly by an amount equal to the sum of the distance by which the primitive edges have been moved outwardly in the expanded version of the primitive (so as to, in effect, cancel the outward offset of the primitive's edges), and the offset amount corresponding to the desired uncertainty region (as discussed above with respect to the expanded version of the primitive) (so as to, in effect, then define an inner uncertainty region for the primitive).

Thus in the case, for example, where the uncertainty offset that is used corresponds to $1/256$ of a pixel, then the offset amount for the sampling points for a pixel (for the render output region) for the inner coverage testing will be $1/128$ of a pixel (in the appropriate axis direction).

While it would be possible to test all eight offset sampling points illustrated in FIG. 7 for a given pixel (render output region) for the purposes of the inner coverage testing, the Applicants have recognised that in fact if the appropriate one of the eight offset sampling points is tested, that can then be taken as indicating whether all of the sampling points in the group will be covered by the primitive edge. In other words, it is possible to test only one of the eight sampling points to determine the inner coverage result for an edge for the pixel (or other render output region).

Thus, in the present embodiment, only a single one of the offset sampling points representing the pixel (or other render output region) is tested against each modified, expanded edge of the primitive to determine whether the pixel is definitely covered by the primitive (i.e. to perform the inner coverage analysis for the conservative rasterisation process).

The offset sampling point that is to be tested is selected based on the major-direction and slope of the edge that is being tested for a primitive, where the slope and major direction of the edge is given by the values of the constants "a" and "b" of the line equation ax+by+c=0 representing the edge.

In particular, as shown in FIG. 7, if the primitive edge is "x-major" (i.e. |a|<|b|), then the rasterisation stage will narrow down the selection to one of the four offset sampling points that have been offset in the y-direction. This is denoted in FIG. 7 by the four sampling points that lie on the dotted lines pointed to by the "x-major" arrows.

Conversely, if the primitive edge is "y-major" (i.e. |a|>|b|), then the rasterisation stage will narrow down the selection to one of the four offset sampling points that have been offset in the x-direction. This is denoted in FIG. 7 by the four sampling points that lie on the dotted lines pointed to by the "y-major" arrows.

Which offset sampling point is selected from the four sampling points indicated by the major direction of the edge is given by the slope of the edge, and determined using the signs of the constants "a" and "b" of the line equation for the edge.

As shown in FIG. 7, if the signs of a and b are both positive then the rasterisation stage will select the relevant offset sampling point that belongs to the top-right quadrant of the group of sampling points for the pixel (region); if the signs of a and b are both negative, then the rasterisation stage will select the relevant offset sampling point that belongs to the bottom-left quadrant of the group; if the sign of a is positive and the sign of b is negative, then the rasterisation stage will select the relevant offset sampling point that belongs to the bottom-right quadrant of the region; and if the sign of a is negative and the sign of b is positive, then the rasterisation stage will select the relevant offset sampling point that belongs to the top-left quadrant of the group.

A single sampling point to test for the purposes of the inner coverage analysis for the primitive is determined in the above manner for each edge of the expanded primitive 14, and then the edge in question is tested against that selected sampling point to determine if the edge covers the sampling point or not. If each edge (if all the edges) are determined to cover their respective, selected sampling point, then the pixel (render output region) in question is determined to be definitely (to be guaranteed to be) fully covered by the primitive, and so can be, and is in an embodiment, indicated as such (e.g. by setting an appropriate "inner coverage" flag for the pixel or render output region) in question.

Figure 8:
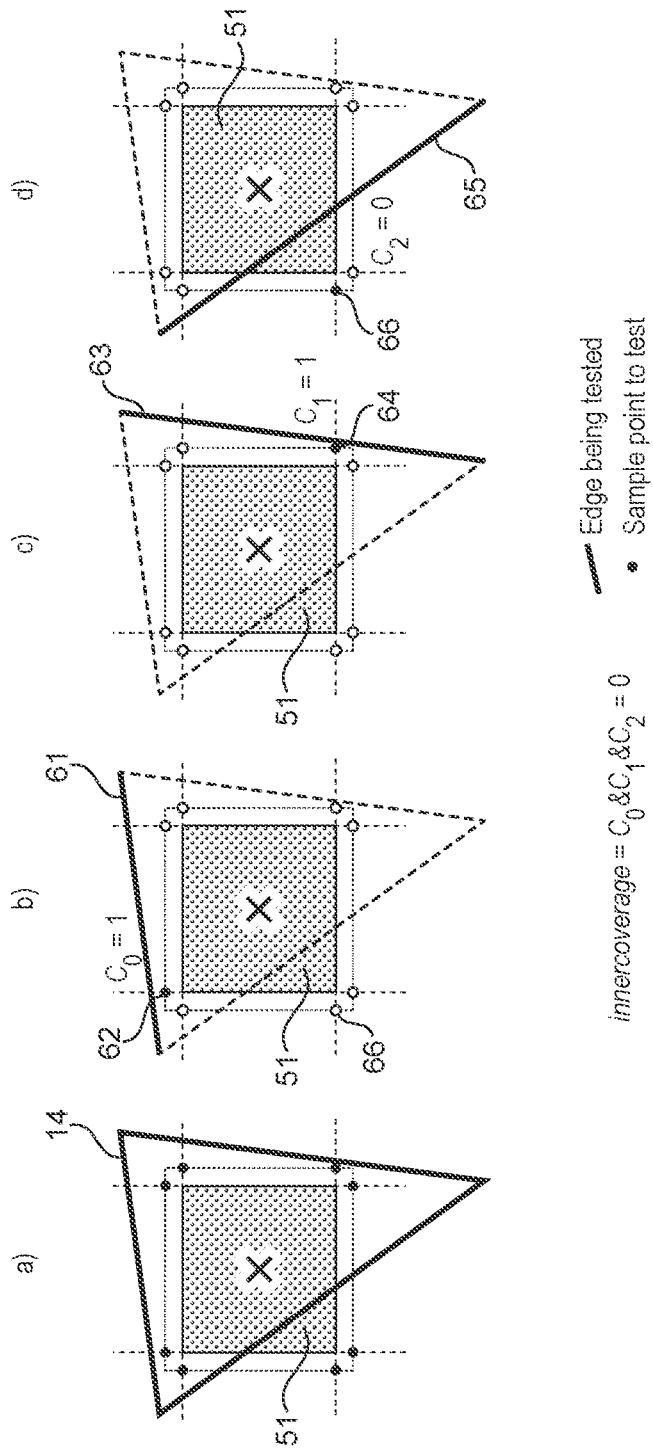
FIG. 8 illustrates schematically a process for selecting an offset sampling point to be tested for each edge of a primitive to be tested during the inner coverage analysis, according to an embodiment of the technology described herein.

FIG. 8 illustrates the process for selecting offset sampling points to be tested for the edges of a primitive for inner coverage analysis in this embodiment of the technology described herein.

FIG. 8a shows the modified outer edges 14 of an expanded primitive that is to be tested against the pixel 51 of FIG. 5. As can be seen, the sampling points at each corner of the pixel 51 have been offset in order to perform the inner coverage tests of the conservative rasterisation process in the manner discussed above.

FIG. 8b shows that for the first edge 61 of the graphics primitive 14, the sampling point 62 will be selected as the sampling point to test against the primitive edge 61 to determine whether that edge of the primitive covers the pixel 51.

Correspondingly, FIG. 8c shows that the sampling point 64 will be selected for testing the edge 63 of the primitive, and FIG. 8d shows that the sampling point 66 will be tested for the edge 65 of the expanded primitive 14.

It can be seen from these Figures, that the sampling point that is selected for testing against a primitive edge is, in effect, the sampling point that will first be crossed by the edge if the edge starts from a position outside all of the sampling points and is moved in its minor axis direction towards the centre of the pixel. The effect of this then is the testing of that identified sampling point can be used as an indication of whether all of the sampling points for the pixel are covered by the primitive edge or not (as that sampling point in question will be the "first" sampling point not to be covered by the edge).

As shown in FIG. 8, each edge is tested against its respective selected sampling point to determine whether the edge covers the sampling point or not (whether the sampling point "passes" the edge test for the edge or not). Only if all the edges cover their respective selected sampling points, is the pixel determined to be fully covered by the primitive.

Thus, for example, in the example shown in FIG. 8, edges 61 and 63 cover their selected sampling points (thus the inner coverage value for those edges is, e.g., set to "1"), but the third edge 65 of the expanded primitive 14 does not cover its selected sampling point 66 (so its inner coverage value is set to "0"). Accordingly, the expanded primitive 14 is determined not to fully and definitely cover the pixel 51 (as the combined (ANDed) inner coverage values for the edges equals "0"), i.e. it fails the inner coverage test.

The inner coverage operation in the present embodiments is in an embodiment used to identify those pixels (or other render output regions) that will be fully covered by a primitive, and that information is then provided, e.g. by identifying the pixels (regions) appropriately, for use by other processing stages of the graphics processing pipeline, such as appropriate shaders of the graphics processing pipeline, for example for use when performing occlusion culling. (Irrespective of the inner coverage testing result, the actual rasterisation of a primitive to generate fragments for rendering the primitive is in an embodiment done using the outer coverage testing for the primitive in the manner discussed above.)

In the present embodiments, the inner coverage testing is in an embodiment only performed for the final subdivision of the render output into regions, e.g., and in an embodiment, for respective pixels of the render output (in contrast to the outer coverage testing, which as discussed above, is in an embodiment done in a progressive, hierarchical fashion). In an embodiment, a given primitive is rasterised using outer coverage testing in the manner discussed above, and then if inner coverage is also to be tested, the final pixel level sampling testing is re-run using modified sampling point positions as discussed above.

Although the conservative outer coverage rasterisation method (FIGS. 3-5) has been described above separately to the conservative inner coverage rasterisation method (FIGS. 6-8), it will be appreciated that according to embodiments of the technology described herein, the graphics processing system is configured to perform both the outer and inner coverage testing for a primitive. This combined operation will now be described with reference to FIGS. 9 and 10.

Figure 9:
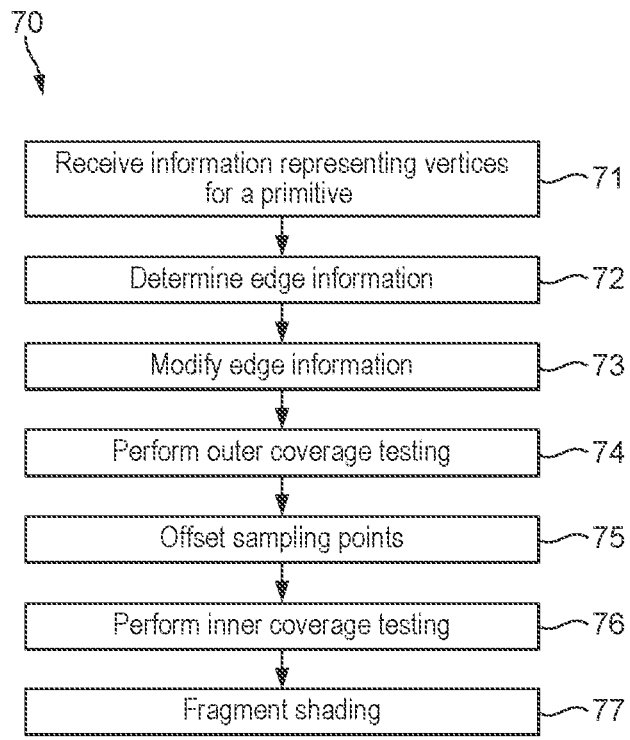
FIG. 9 is a flow diagram illustrating schematically a method of conservative rasterisation according to an embodiment of the technology described herein.

FIG. 9 shows in more detail the operation of a graphics processing pipeline according to an embodiment of the technology described herein. In particular, FIG. 9 is a flow chart illustrating the operational steps executed by a graphics processing pipeline when processing a primitive in an embodiment of the technology described herein.

Figure 10:
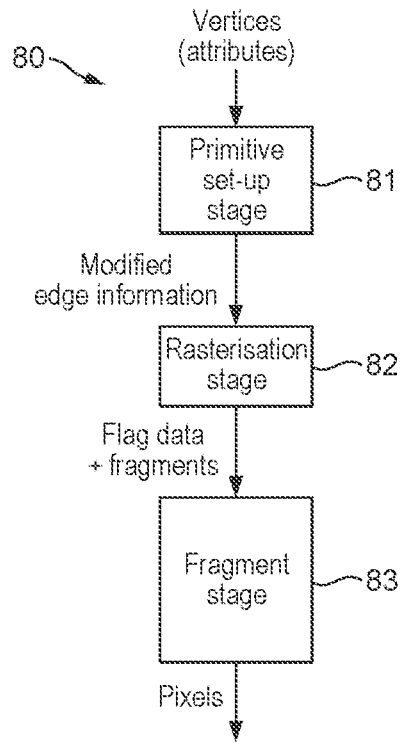
FIG. 10 shows schematically the operation of a tile-based graphics processing pipeline according to embodiments of the technology described herein.

FIG. 10 correspondingly shows schematically the stages of the graphics processing pipeline that perform the operation shown in FIG. 9.

FIG. 10 shows some but not all of the stages and components of the overall graphics processing pipeline, namely the stages that are relevant to the operation of the present embodiment. FIG. 10 thus shows a primitive set-up stage 81, a rasterisation stage 82 and a fragment frontend and fragment shader stage 83 of the graphics processing pipeline 80.

As shown in FIGS. 9 and 10, the process starts when information representing the primitive's vertices is provided to (received by) a primitive set-up stage 81 (FIG. 10) of the graphics processing pipeline 80 (step 71).

The primitive set-up stage 81 of the graphics processing pipeline determines (at step 72) from the vertex information, edge information representing the positions of the edges of the primitive (which in the present embodiment is, for each respective edge of the primitive, in the form of a line equation of the form described above).

The primitive set-up stage 81 then performs a modification operation on the edge information determined at step 72 to determine modified edge information that represents the edges of an expanded version of the primitive (step 73) (i.e. including a desired uncertainty region around the outside edges of the primitive as discussed above).

The modified edge information defining the expanded primitive is then used by the rasterisation stage 82 of the graphics processing pipeline (FIG. 10) to perform the outer coverage testing of the conservative rasterisation process (step 74). This will include the rasterisation stage 82 determining, for the "expanded" primitive, which regions of the graphics render output the expanded primitive at least partially covers (as discussed above).

The result of the outer coverage test is used by the rasterisation stage 82 to generate appropriate graphics fragments for rendering (shading) the primitive. In particular, if it is determined that a region of the render output is at least partially covered by a primitive when taking into account the potential error in the primitive's position, then the rasterisation stage 82 generates an appropriate graphics fragment or fragments representing that primitive for that region.

The rasterisation stage 82 is also configured to perform the inner coverage tests for the conservative rasterisation process for the primitive.

As such the rasterisation stage 82 will proceed to generate groups of offset sampling points for regions of the graphics render output (step 75), and then compare the expanded primitive against the groups of offset sampling points to perform inner coverage testing for the expanded primitive (step 76).

As described above in relation to FIGS. 7 and 8, this is done by determining, for each primitive edge 14 to be tested, a single offset sampling point to be tested against the primitive edge 14 in question, and subsequently testing that offset sampling point to determine whether the offset sampling point is covered by the primitive in question. If the result of the inner coverage testing indicates that a region (e.g. pixel) of the render output is definitely covered by a primitive irrespective of any potential error in the primitive's dimensions, then a flag indicating that is set for the primitive (and, e.g., used later on in the graphics processing pipeline for, e.g., collision detection, occlusion culling and visibility detection operations).

The fragment(s) and flag that have been generated or set for the primitive at the rasterisation stage 82 are sent to the fragment shader stage 83. The fragment shader stage 83 renders the fragment(s) representing the primitive and performs any other desired graphics processing operations, such as collision detection, occlusion culling and visibility detection operations, using the "fully covered" flag for the primitive. The fragment rendering process derives data, such as red, green and blue (RGB) colour values and an "Alpha" (transparency) value, necessary to represent the primitive at the sampling positions of the render target (i.e. the fragment shader "shades" the sample positions of the render target).

The rendered fragment data (sampling position data) is then written to a tile buffer and, subsequently, written out as pixel data to a frame buffer, e.g. for display (this may include backend fragment operations, such as downsampling, to determine the final pixel colours to be stored in the frame buffer). This is repeated for each primitive being processed.

In the above arrangements where each group of sampling points contains four sampling points set at the corners of the associated render output region (e.g. pixel), the rasterisation stage will perform for each edge: four coverage tests for the outer coverage, i.e. one test for each corner sampling point, and one coverage test for the inner coverage, i.e. one test for the selected offset sampling point, which equals five sampling point tests in total per region per edge of the primitive.

However, the Applicants have further recognised that if the rasterisation stage is configured to process sets of plural contiguous render output regions in parallel (e.g. sets of 2×2 regions), then as adjacent regions in such sets will share at least some sides, and thus also corner sampling points, the result of the coverage test for an edge for a common sampling point can be used in common for each region of the set that shares the sampling point in question, when determining outer coverage for a primitive. This can then be used to reduce the overall number of sampling point coverage tests that will be performed.

This is illustrated in FIG. 11a, which shows an array 100 of render output regions 11, in this case corresponding to pixels, of a render output to be generated.

In this embodiment, each pixel 11 of the render output has a group of four sampling points corresponding to the corners of the pixel associated with it that are tested by the rasterisation process. This is illustrated in FIG. 11a for pixel 101 by the sampling points 105, 106, 107 and 108 set at the corners of the pixel 101. Similarly, for pixel 102 sampling points 107, 108, 109 and 110 set at its corners are used. It can be seen that pixels 101 and 102 of the array 100 will share two sampling points, sampling points 107 and 108.

(It will be appreciated that each pixel in the array will share two sampling points with an adjacent pixel.)

The rasterisation stage is then configured to test sets of 2×2 contiguous pixels against an outer edge 14 of an expanded primitive in parallel. That is, the array 100 of render output pixels is divided into a plurality of sets of 2×2 contiguous pixels, and the rasterisation stage is configured to perform the rasterisation operation for a first set of 2×2 contiguous pixels, followed by a second (different) set, and so on and so forth until all of the sets of pixels have been rasterised accordingly. FIG. 11a accordingly illustrates the rasterisation stage operation when testing a given set of four pixels, corresponding to pixels 101, 102, 103 and 104 of the array 100.

When determining outer coverage for a primitive against a 2×2 set of pixels, the rasterisation stage is configured to test the nine unique corner sampling positions for the 2×2 set of pixels against the expanded primitive and to use the result of the coverage test for the edge 14 for a "shared" sampling point for each pixel that the sampling point in question is common to.

In this regard, it can be seen in FIG. 11a that sampling point 108 is common to (shared by) all four pixels 101, 102, 103 and 104, and so the result of the outer coverage test for edge 14 against sampling point 108 will be used to determine if the primitive edge 14 at least partially covers each respective pixel 101, 102, 103 and 104 of the set. It can be seen in FIG. 11a that sampling point 108 is in fact covered by the primitive edge 14, and so the result of the outer coverage testing against sampling point 108 will be used to determine/identify that all four pixels 101, 102, 103 and 104 are covered by edge 14 of the primitive.

Similarly, the result of the outer coverage test for sampling point 107, which is common to pixels 101 and 102 of the set, will be used to determine whether the primitive edge 14 at least partly covers pixels 101 and/or 102.

Sampling point 110, however, is only used for a single pixel (pixel 102) of the 2×2 set and so the result of that sampling point will not be used to determine if the primitive edge 14 at least partially covers any other pixels of the set, i.e. other than pixel 102.

When determining the inner coverage for the set of four pixels 101, 102 103 and 104, the rasterisation stage will operate according to the embodiments described with respect to FIGS. 7 and 8.

In particular, as mentioned above, for each corner of the respective pixels (101, 102, 103 and 104) to be tested for inner coverage, two offset sampling points are created for the inner coverage analysis: one sampling point representing the original sampling point at the corner offset in the x-axis direction, and another sampling point representing the original sampling point at the corner offset in the y-axis direction. A single offset sampling point to be tested for each pixel 101, 102, 103 and 104 is then selected to be tested.

This is illustrated in FIG. 11b, which is an expanded view of pixels 101, 102, 103 and 104, showing also a modified sampling point grid for those pixels. In particular, FIG. 11b shows the offset sampling point positions to be used for the pixels when testing the inner coverage (it will be appreciated that each "dot" in FIG. 11b represents an offset sampling point position.)

As mentioned above, the single offset sampling point to be tested for each pixel is the offset sampling point that would be the first sampling point to be crossed as a line that is parallel to the edge 14 is moved in the direction of the minor axis of the edge 14 from a position outside all of the sampling points in the modified group of sampling points for the render output pixel towards the centre of the primitive.

These offset sampling points are illustrated in FIG. 11b as offset sampling points 112, 113, 114 and 115, corresponding respectively to pixels 101, 102, 103 and 104.

In this way, it can be seen that only nine sampling point edge tests will be performed for the outer coverage determination for pixels 101, 102, 103 and 104 of the array 100, and only four tests will be performed for the inner coverage, for the edge 14 of the primitive. Thus a total of thirteen sampling point tests per set of four pixels (101, 102, 103 and 104) to be processed will be performed for each edge 14 of the primitive, rather than the twenty sampling point tests that would be the case if each pixel was tested (treated) separately. This is advantageous in that it reduces the overall number of sampling point coverage tests that will be performed to determine the coverage of the pixels in the set of pixels by a primitive (as compared to if each pixel was treated (tested) individually).

Figure 11:
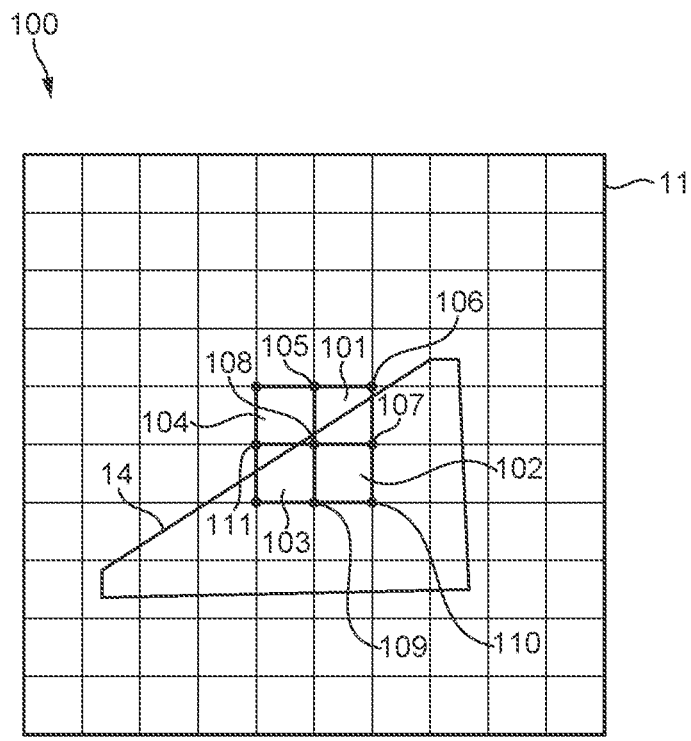
FIG. 11 shows schematically the operation of the rasterisation stage when configured to test sets of 2×2 contiguous render output regions in parallel.
Figure 11:
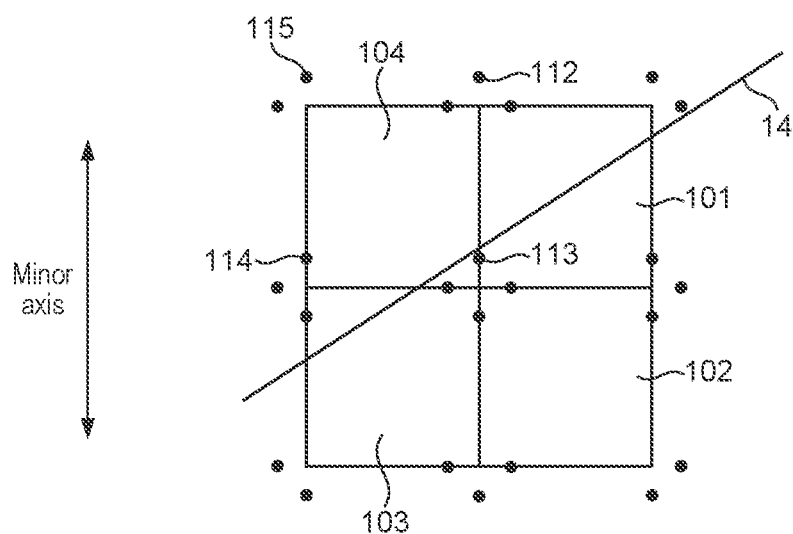

The process described with respect to FIG. 11 (FIGS. 11a and 11b) will then be repeated for each desired set of four pixels in the array 100, until all of the desired pixels in the array 100 have been subjected to the conservative rasterisation testing for the edge 14.

While the outer coverage testing has been described above with respect to testing nine unique corner sampling positions for the 2×2 set of pixels against the expanded primitive, other arrangements would be possible. For example, the Applicants have recognised that, for the outer coverage determination, it may be possible to test fewer sampling points, such as only four sampling points, e.g. to determine whether any part of a pixel or set of, e.g., 2×2, pixels, is at all covered. It can be seen from the above that the technology described herein, in its embodiments at least, provides a system that can perform conservative rasterisation in an efficient manner.

This is achieved in the embodiments of the technology described herein at least, by determining at the primitive set-up stage modified edge information that accounts for an error associated with the dimensions of the primitive, and then using that modified edge information when rasterising the primitive.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a graphics processing pipeline that includes a plurality of processing stages including a primitive set-up stage and a rasterisation stage, the method comprising:

the primitive set-up stage receiving information representing vertices defining a primitive to be rendered by the graphics processing pipeline and determining therefrom edge information representing the positions of an edge or edges of the primitive;

the primitive set-up stage using the determined edge information to determine, for the primitive, modified edge information representing modified positions for the edge or edges of the primitive, wherein the modified positions for the edge or edges of the primitive are positions of the edge or edges of an expanded version of the primitive, the edge or edges of the expanded version of the primitive being shifted outward, away from the centre of the primitive, relative to the edge or edges of the primitive; and the rasterisation stage performing conservative rasterisation testing for the primitive, wherein the conservative rasterisation testing comprises inner coverage conservative rasterisation testing for the primitive and outer coverage conservative rasterisation testing for the primitive that both use the modified edge information for the primitive, such that the outer coverage conservative rasterisation testing and the inner coverage conservative rasterisation testing are both performed by testing the positions of the edge or edges of the expanded version of the primitive that are shifted outward, away from the centre of the primitive, relative to the edge or edges of the primitive, and wherein the rasterisation stage performing conservative rasterisation for the primitive comprises, for the inner coverage conservative rasterisation testing, determining, for at least one region of a graphics render output being generated, whether the primitive covers the region of the render output by:

testing said edge or edges of the expanded version of the primitive against a modified group of one or more sampling points, wherein the modified group of one or more sampling points comprises an offset sampling point having a position that has been modified as compared to the position of a sampling point of an unmodified group of one or more sampling points from a sampling point grid representing the render output being generated that represents the region of the render output.

2. The method of claim 1, further comprising:
the primitive set-up stage determining modified edge information that represents edges of the primitive that have been moved outwards, relative to the position of the edges as defined by the original edge information determined by the primitive set-up stage from the vertices for the primitive, by an offset amount.

3. The method of claim 2, wherein:
the offset amount by which a primitive edge is offset is based on the size and/or nature of the sampling point grid that is to be used during the rasterisation process.

4. The method of claim 1, wherein:
the edge information comprises line equations representing each edge of the primitive; and
determining modified edge information for the primitive comprises adjusting the edge information by detecting the major axis of each edge from the line equations, and moving each edge outwardly relative to the centre of the primitive in the minor axis direction of the edge.

5. The method of claim 1, wherein:
the rasterisation stage performing conservative rasterisation for the primitive comprises:

for the outer coverage conservative rasterisation testing, testing the edge or edges of the expanded version of the primitive using the unmodified group of one or more sampling points.

6. The method of claim 1, wherein:
the modified group of one or more sampling points representing the region comprises two offset sampling points for each sampling point in the unmodified group of one or more sampling points, one offset sampling point representing the unmodified sampling point offset in one axis direction by a particular offset amount, and another offset sampling point representing the unmodified sampling point offset in another direction by the particular offset amount.

7. The method of claim 1, wherein the method comprises, for each edge of the modified primitive that is to be tested:
first selecting for the edge a single offset sampling point of the modified group of sampling points to be tested to determine whether the edge covers the region of the render output represented by the modified group of sampling points;
testing the primitive edge against the selected offset sampling point of the modified group of sampling points representing the region of the render output; and
using the result of the testing of the selected offset sampling point against the primitive edge to determine whether the primitive edge covers the render output region represented by the modified group of sampling positions.

8. The method of claim 1, wherein:
the rasterisation stage tests plural groups of sampling points representing a set of plural regions of the render output against an edge of a modified primitive in parallel.

9. The method of claim 8, wherein:
the sampling points from the plural groups of one or more sampling points representing the regions of the set of plural regions of the render output, include at least one sampling point that is common to at least two of the groups of sampling points representing regions of the set; and
the at least one common sampling point is tested only once for the primitive edge, with the result of that single testing of the common sampling point being used in common for the regions that the sampling point is common to, for the outer coverage conservative rasterisation testing for the primitive.

10. A graphics processor comprising:
primitive set-up circuitry configured to:
receive information representing vertices defining a primitive to be rendered by the graphics processing pipeline and to determine therefrom edge information representing the position of the edges of the primitive; and
use the determined edge information to determine, for the primitive, modified edge information representing modified positions for the edge or edges of the primitive, wherein the modified positions for the edge or edges of the primitive are positions of the edge or edges of an expanded version of the primitive, the edge or edges of the expanded version of the primitive being shifted outward, away from the centre of the primitive, relative to the edge or edges of the primitive; and
rasterisation circuitry configured to both:
use the modified edge information for the primitive to perform inner coverage conservative rasterisation testing, such that the inner coverage conservative rasterisation testing is performed by testing the positions of the edge or edges of the expanded version of the primitive that are shifted outward, away from the centre of the primitive, relative to the edge or edges of the primitive; and use the modified edge information for the primitive to perform outer coverage conservative rasterisation testing, such that the outer coverage conservative rasterisation testing is performed by testing the positions of the edge or edges of the expanded version of the primitive that are shifted outward, away from the centre of the primitive, relative to the edge or edges of the primitive;

wherein the rasterisation circuitry is configured to use the modified edge information for the primitive to, for the inner coverage conservative rasterisation testing, determine, for at least one region of a graphics render output being generated, whether the primitive covers the region of the render output by:

testing said edge or edges of the expanded version of the primitive against a modified group of one or more sampling points, wherein the modified group of one or more sampling points comprises an offset sampling point having a position that has been modified as compared to the position of a sampling point of an unmodified group of one or more sampling points from a sampling point grid representing the render output being generated that represents the region of the render output.

11. The processor of claim 10, wherein:
the primitive set-up circuitry is configured to determine modified edge information that represents edges of the primitive that have been moved outwards, relative to the position of the edges as defined by the original edge information determined by the primitive set-up circuitry from the vertices for the primitive, by an offset amount.

12. The processor of claim 11, wherein:
the offset amount by which a primitive edge is offset is based on the size and/or nature of the sampling point grid that is to be used during the rasterisation process.

13. The processor of claim 10, wherein:
the edge information comprises line equations representing each edge of the primitive; and
determining modified edge information for the primitive comprises adjusting the edge information by detecting the major axis of each edge from the line equations, and moving each edge outwardly relative to the centre of the primitive in the minor axis direction of the edge.

14. The processor of claim 10, wherein:
the rasterisation circuitry is configured to perform the outer coverage conservative rasterisastion testing by:
testing the edge or edges of the expanded version of the primitive using the unmodified group of one or more sampling points.

15. The processor of claim 10, wherein:
the modified group of one or more sampling points representing the region comprises two offset sampling points for each sampling point in the unmodified group of one or more sampling points, one offset sampling point representing the unmodified sampling point offset in one axis direction by a particular offset amount, and another offset sampling point representing the unmodified sampling point offset in another direction by the particular offset amount.

16. The processor of claim 10, wherein the rasterisation circuitry is configured to, for each edge of the modified primitive that is to be tested:
first select for the edge a single offset sampling point of the modified group of sampling points to be tested to determine whether the edge covers the region of the render output represented by the modified group of sampling points;
test the primitive edge against the selected offset sampling point of the modified group of sampling points representing the region of the render output; and
use the result of the testing of the selected sampling point against the primitive edge to determine whether the primitive edge covers the render output region represented by the modified group of sampling positions.

17. The processor of claim 10, wherein:
the rasterisation circuitry is configured to test plural groups of sampling points representing a set of plural regions of the render output against an edge of a modified primitive in parallel.

18. The processor of claim 17, wherein:
the sampling points from the plural groups of one or more sampling points representing the regions of the set of plural regions of the render output include at least one sampling point that is common to at least two of the groups of sampling points representing regions of the set; and
the at least one common sampling point is tested only once for the primitive edge, with the result of that single testing of the common sampling point being used in common for the regions that the sampling point is common to, for the outer coverage conservative rasterisation testing for the primitive.

19. A non-transitory computer readable storage medium storing computer software code which when executing on a processor performs a method of operating a graphics processing pipeline that includes a plurality of processing stages including a primitive set-up stage and a rasterisation stage, the method comprising:
the primitive set-up stage receiving information representing vertices defining a primitive to be rendered by the graphics processing pipeline and determining therefrom edge information representing the positions of an edge or edges of the primitive;
the primitive set-up stage using the determined edge information to determine, for the primitive, modified edge information representing modified positions for the edge or edges of the primitive, wherein the modified positions for the edge or edges of the primitive are positions of the edge or edges of an expanded version of the primitive, the edge or edges of the expanded version of the primitive being shifted outward, away from the centre of the primitive, relative to the edge or edges of the primitive; and
the rasterisation stage performing conservative rasterisation testing for the primitive, wherein the conservative rasterisation testing comprises inner coverage conservative rasterisation testing for the primitive and outer coverage conservative rasterisation testing for the primitive that both use the modified edge information for the primitive, such that the outer coverage conservative rasterisation testing and the inner coverage conservative rasterisation testing are both performed by testing the positions of the edge or edges of the expanded version of the primitive that are shifted outward, away from the centre of the primitive, relative to the edge or edges of the primitive, and wherein the rasterisation stage performing conservative rasterisation for the primitive comprises, for the inner coverage conservative rasterisation testing, determining, for at least one region of a graphics render output being generated, whether the primitive covers the region of the render output by:

testing said edge or edges of the expanded version of the primitive against a modified group of one or more sampling points, wherein the modified group of one or more sampling points comprises an offset sampling point having a position that has been modified as compared to the position of a sampling point of an unmodified group of one or more sampling points from a sampling point grid representing the render output being generated that represents the region of the render output.

\* \* \* \* \*